US008293298B2

(12) United States Patent
Van Esbroeck et al.

(10) Patent No.: US 8,293,298 B2
(45) Date of Patent: Oct. 23, 2012

(54) ADDING AN ADDITIVE TO A MEAT PRODUCT

(75) Inventors: Maurice Eduardus Theodorus Van Esbroeck, Bemmel (NL); Henricus Franciscus Jacobus Maria Van Der Eerden, Gemert (NL); Adrianus Josephes Van Den Nieuwelaar, Gemert (NL)

(73) Assignee: Marel Stork Poultry Processing B.V. (NL)

( * ) Notice: Subject to any disclaimer, the term of this patent is extended or adjusted under 35 U.S.C. 154(b) by 0 days.

(21) Appl. No.: 12/574,837

(22) Filed: Oct. 7, 2009

(65) Prior Publication Data
US 2010/0021618 A1 Jan. 28, 2010

Related U.S. Application Data

(60) Division of application No. 09/865,180, filed on May 24, 2001, which is a continuation of application No. PCT/NL99/00725, filed on Nov. 25, 1999.

(30) Foreign Application Priority Data

Nov. 27, 1998 (NL) .................................... 1010673

(51) Int. Cl.
*A23L 1/318* (2006.01)
(52) U.S. Cl. ........ 426/281; 426/442; 426/644; 426/652; 99/532
(58) Field of Classification Search .................. 426/235, 426/236, 129, 281, 332, 644, 442, 652; 99/516, 99/532; 118/13, 24, 314, 320; 452/141, 452/142, 143
See application file for complete search history.

(56) References Cited

U.S. PATENT DOCUMENTS

| 1,402,204 | A | | 1/1922 | Alsop | |
|---|---|---|---|---|---|
| 1,748,082 | A | * | 2/1930 | Richardson et al. | 452/72 |
| 2,783,496 | A | * | 3/1957 | Thomas | 452/77 |
| 2,972,167 | A | * | 2/1961 | Roth et al. | 452/77 |
| 3,203,809 | A | | 8/1965 | Visness et al. | |
| 3,476,082 | A | | 11/1969 | Cowles | |
| 3,631,563 | A | | 1/1972 | Snowden | |
| 3,729,773 | A | | 5/1973 | Dillon | |
| 3,965,536 | A | * | 6/1976 | Osiadacz et al. | 99/533 |
| 3,971,088 | A | | 7/1976 | Osiadacz | |
| 4,012,808 | A | | 3/1977 | Strong | |

(Continued)

FOREIGN PATENT DOCUMENTS
DE 3034284 4/1981
(Continued)

OTHER PUBLICATIONS

Oxford English Dictionary, Second Edition, 1989, available at www.oed.com/oed2/00006405 and www.oed.com/oed2/00172168; accessed on Jul. 15, 2011.*

(Continued)

*Primary Examiner* — C. Sayala
*Assistant Examiner* — Walter Moore
(74) *Attorney, Agent, or Firm* — Kilpatrick Townsend & Stockton LLP

(57) ABSTRACT

Method and device for treating meat products, in particular slaughtered poultry or parts thereof, in which an additive is added to the meat products.
The meat products are mounted on product holders and conveyed an additive-adding device that treats the meat products with an additive. Thereafter, the meat products are further conveyed to a massaging device that massages the meat products.

23 Claims, 20 Drawing Sheets

U.S. PATENT DOCUMENTS

| | | | |
|---|---|---|---|
| 4,196,221 | A | 4/1980 | Dew |
| 4,199,958 | A | 4/1980 | Masuda et al. |
| 4,208,438 | A | 6/1980 | Saurenman |
| 4,372,981 | A | 2/1983 | Lieberman |
| 4,413,279 | A | 11/1983 | Gorl |
| 4,627,007 | A | 12/1986 | Muschany |
| 4,695,356 | A | 9/1987 | Vander Poorten |
| 4,810,515 | A | 3/1989 | Bourdel |
| 4,851,241 | A | 7/1989 | Tsuji et al. |
| 5,178,890 | A * | 1/1993 | van den Nieuwelaar et al. ............. 426/332 |
| 5,238,709 | A | 8/1993 | Wilkie |
| 5,287,801 | A | 2/1994 | Clark |
| 5,362,507 | A | 11/1994 | Ludwig |
| 5,370,734 | A | 12/1994 | Ferrero |
| 5,405,630 | A | 4/1995 | Ludwig |
| 5,449,524 | A | 9/1995 | Ludwig |
| 5,490,992 | A | 2/1996 | Andrews et al. |
| 5,505,657 | A * | 4/1996 | Janssen et al. ............. 452/179 |
| 5,668,634 | A | 9/1997 | Newman |
| 5,674,549 | A * | 10/1997 | Chmiel et al. ............. 426/602 |
| 5,714,188 | A | 2/1998 | Gilchrist |
| 5,902,619 | A | 5/1999 | Rubow et al. |
| 6,010,726 | A | 1/2000 | Evans et al. |
| 6,010,729 | A | 1/2000 | Gutzmann et al. |
| 6,054,154 | A | 4/2000 | Wang |
| 6,063,425 | A | 5/2000 | Kross et al. |
| 6,103,286 | A | 8/2000 | Gutzmann et al. |
| 6,309,681 | B1 | 10/2001 | Prasad et al. |
| 2002/0034565 | A1 | 3/2002 | Van Esbroeck |

FOREIGN PATENT DOCUMENTS

| | | |
|---|---|---|
| DE | 3209730 | 9/1983 |
| DE | 4126890 | 2/1993 |
| DE | 19743439 | 10/1998 |
| EP | 0254332 | 1/1988 |
| EP | 0 455 611 | 11/1991 |
| EP | 0462444 | 12/1991 |
| EP | 0462671 | 12/1991 |
| EP | 0 575 025 | 12/1993 |
| EP | 0584955 | 3/1994 |
| EP | 0587515 | 3/1994 |
| EP | 0827695 | 3/1998 |
| EP | 0853885 | 7/1998 |
| EP | 0879561 | 11/1998 |
| EP | 1514483 | 3/2005 |
| FR | 2659529 | 9/1991 |
| FR | 2534454 | 4/2004 |
| GB | 2000430 | 1/1979 |
| GB | 2177585 | 1/1987 |
| GB | 2277469 | 11/1994 |
| GB | 2278554 | 12/1994 |
| JP | 61164668 | 7/1986 |
| JP | 61268380 | 11/1986 |
| SU | 935056 | 6/1982 |
| WO | WO 8400472 | 2/1984 |
| WO | WO 9313671 | 7/1993 |
| WO | WO 9614760 | 5/1996 |
| WO | WO 9820981 | 5/1998 |
| WO | WO 0032051 | 6/2000 |

OTHER PUBLICATIONS

Examiner's Answer dated Jun. 23, 2009 in U.S. Appl. No. 09/865,180.
Corrected Appeal Brief dated Apr. 7, 2009 in parent U.S. Appl. No. 09/865,180.
Response dated Apr. 7, 2009 in parent U.S. Appl. No. 09/865,180.
Office Action dated Jul. 1, 2008 in parent U.S. Appl. No. 09/865,180.
Response to Office Action dated Mar. 17, 2008 in parent U.S. Appl. No. 09/865,180.
Office Action dated Oct. 17, 2007 in parent U.S. Appl. No. 09/865,180.
Response dated Aug. 13, 2007 in parent U.S. Appl. No. 09/865,180.
Office Action dated Feb. 13, 2007 in parent U.S. Appl. No. 09/865,180.
Response dated Jun. 6, 2006 in parent U.S. Appl. No. 09/865,180.
Office Action dated Dec. 7, 2005 in parent U.S. Appl. No. 09/865,180.
Response dated Oct. 27, 2005 in parent U.S. Appl. No. 09/865,180.
Office Action dated May 27, 2005 in parent U.S. Appl. No. 09/865,180.
Response dated Dec. 21, 2004 in parent U.S. Appl. No. 09/865,180.
Response dated Sep. 14, 2004 in parent U.S. Appl. No. 09/865,180.
Office Action dated Sep. 3, 2004 in parent U.S. Appl. No. 09/865,180.
Response dated Jul. 22, 2004 in parent U.S. Appl. No. 09/865,180.
Office Action dated Jan. 21, 2004 in parent U.S. Appl. No. 09/865,180.
Response dated May 9, 2003 in parent U.S. Appl. No. 09/865,180.
Office Action dated Apr. 9, 2003 in parent U.S. Appl. No. 09/865,180.
Response dated Dec. 30, 2002 in parent U.S. Appl. No. 09/865,180.
Office Action dated Oct. 4, 2002 in parent U.S. Appl. No. 09/865,180.

* cited by examiner

ADDING AN ADDITIVE TO A MEAT PRODUCT

CROSS-REFERENCE TO RELATED APPLICATIONS

This application is a divisional of U.S. patent application Ser. No. 09/865,180 filed May 24, 2001, which application is a continuation application of International Application No. PCT/NL99/00725 filed Nov. 25, 1999, which claims priority to Netherlands Application No. 1010673 filed Nov. 27, 1998, the contents of all of which are incorporated herein by reference.

FIELD OF THE INVENTION

The present invention relates to methods and devices for treating meat and meat products which are intended for human consumption, which treatment involves adding an additive to the product. In particular, the invention relates to carrying out such treatment on an industrial scale, i.e. with a large capacity.

The invention relates in particular to the treatment of slaughtered poultry and parts thereof, such as for example chicken, and to the treatment of three-dimensional meat products obtained by shaping an inherently shapeless mass of pounded meat which is suitable for human consumption, such as for example, hamburgers, chicken nuggets, etc.

BACKGROUND OF THE INVENTION

In the field of industrial marinating of meat products, it is known to use "tumblers". A tumbler of this nature comprises a movable drum, or a stationary drum containing agitators, into which some of the meat which is to be treated is placed together with a quantity of substantially pulverulent marinade. As a result of the drum being set in motion, the meat comes into contact with the marinade, and the meat is marinated from the outside. These known tumblers have a number of drawbacks. For example, one drawback is that this is a batch process, so that this method of marinating cannot in fact be efficiently incorporated in a continuously operating treatment process for the meat products. One example of such processes is the slaughter of poultry, which currently takes place in a continuous process, with a very high capacity, with the aid of slaughtering installations which operate virtually automatically. Slaughtering installations of this nature supply a virtually constant flow of meat products, which continuity is essentially advantageous for downstream stations, for example continuous ovens and/or packaging stations. If the meat products then have to be marinated using a tumbler, this continuity has to be interrupted, which represents a drawback.

Furthermore, the marination in a tumbler is based in particular on mechanical interaction between the meat products which are present in the tumbler. This means that the amount of meat products must lie within specified limits in order to achieve the desired marination, and consequently the amount of meat in the tumbler cannot be varied as desired. When using a tumbler, the amount of additive which is placed in the tumbler also has to lie within specified limits in order to obtain the correct marination. The fact that both the amount of marinade and the amount of meat has to lie within a specified range in a tumbler results in the further effect, which is deemed to be disadvantageous, that the level of marinade added to the meat also lies within specified limits, usually between 5% and 8%. It is therefore not possible, for example when using a tumbler, to efficiently allow only a very small percentage of marinade to be added to the meat product if good distribution of the marinade in the product is also required. Also, the structure of the meat may be adversely affected by the mechanical action of the tumbler.

A further drawback of using a tumbler is that an excess of marinade builds up in cavities in the product and, considered in a broader sense, that undesirably large amounts of often expensive marinade are required, only a small fraction of which actually reaches the product which is to be treated.

Another known method for marinating (meat) products consists in guiding the product which is to be marinated through a liquid bath, the liquid in the bath having a marinating action. For example, a method is known in which air bubbles are introduced into the bath in order to set the marinade liquid in motion. However, this known method using a liquid bath does not allow integration with a continuous process for the production of meat products, such as integration with a slaughtering installation for poultry.

OBJECTIVES OF THE INVENTION

The object of the invention is to provide methods and devices which make it possible to add additives in a continuous process, preferably "in line" with other treatment processes carried out on the meat products.

A further object of the invention is to provide measures which make it possible for each meat product or small group of associated meat products to be individually treated in an optimum manner with one or more additives.

A further object of the invention is to provide measures which make it possible to control the addition of one or more additives, or a mixture of additives, to the meat product. In this context, the term "control" is understood, inter alia, to mean the provision of optimum treatment of the meat product, in which the desired quantity of the additive is delivered to a part of the meat product which is to be treated, possibly the entire meat product, but in particular a specific, selected part of the meat product, and the desired distribution of the additive over the part which is to be treated is also achieved.

A further object of the invention is to provide measures which make it possible to rapidly adapt the additive-adding process to the supply of meat products to be treated and/or to make it possible to change rapidly between different additives.

The marination methods which are known from the prior art often use marinade which comprises a mixture of a plurality of components. In practice, such mixtures are expensive. Another significant drawback is that many mixtures are impossible to keep, or can only be kept for a short time, since the components of these mixtures are not compatible with one another and/or in time enter into reactions which lead to undesirable reaction products.

Another object of the invention is to provide measures which make it possible to bring together different additives which together are to form a mixture only during or just before the treatment of the meat product. This creates the possibility of new combinations of additives and makes it possible to produce new meat products.

It should be noted that it is important to combat excessive addition of the additive to the meat product in particular if the cost price of the additive is higher than that of the meat product which is to be treated. In some cases, however, it may be that the additive is less expensive that the meat product which is to be treated and that it is in fact possible to increase profits if a large amount of additive can be added, obviously within limits which are acceptable to the consumer.

A further drawback of using a tumbler is that cleaning the tumbler, which is required at least when changing to a different marinade, presents problems and takes up an undesirable length of time.

A further object of the invention is to carry out the additive addition in such a manner that it is possible to do without cleaning, or to carry out cleaning easily and quickly, particularly when changing additive, while ensuring the required hygiene for treatment of the meat products.

A drawback which often arises in the methods according to the prior art, particularly when using a tumbler, is the dislocation, also known as the displacement, of the skin of a meat product, for example the skin on a chicken leg or other poultry portion.

Damage caused by the addition of additive must also be avoided in the treatment of damageable meat products, such as for example, hamburgers. As is known, hamburgers and the like cannot under any circumstances be processed in a tumbler.

Another object of the invention is to propose measures which make it possible to carry out the addition of the additive in such manner that the meat product is treated with care, in particular avoiding dislocation of any skin which may be present.

SUMMARY OF THE INVENTION

The invention provides a large number of measures with which one or more of the abovementioned objects can be achieved.

According to one aspect thereof the invention provides a method for treating a large number of meat products, in particular slaughtered poultry or parts thereof, in which an additive is added to the meat products, wherein the meat products are supplied to additive-adding means using a conveyor means, which conveyor means is designed to feed the meat products sequentially in groups or separately, the additive-adding means subjecting each meat product or each group of meat products to an additive-adding treatment which is adapted to the corresponding meat product or to the corresponding group of meat products.

In a preferred embodiment, during the additive-adding treatment, one or more jets of additive are directed at the meat product in order to apply additive to the outer surface of the meat product.

In order to obtain a uniform distribution of the additive over the outer surface of the meat product it is preferred that the conveyor means is designed to place each meat product which is to be treated in different orientations with respect to the one or more jets of additive.

The additive can be added to the meat product which is to be treated from the outside, so that the additive sticks to the outside of the product or part thereof and, in the process may penetrate into the outer layer of the product.

In an alternative embodiment the additive may be added directly into the interior of the meat product using additive-adding means which cause the additive to penetrate into the meat product which is to be treated.

If it is desired for the additive to be distributed further through the meat product following the internal or external addition, this distribution can be promoted by means of various additional pre-treatments and/or after-treatments of the meat product, such as for example massaging of the meat product and/or a temperature treatment of the product. The invention also provides for further distribution of the additive with the aid of an after-treatment of the meat product using sound waves. It is also possible to provide for activation of the additive for the purpose of distribution through the product by subjecting the product to a treatment using microwaves, or a treatment in a microwave oven.

The invention also provides the possible option of the additive being a pulverulent substance which, after it has been added to the meat product, is activated by contact with liquid or steam.

In addition to after-treatments of the meat product which are carried out after the additive has been added, the invention also provides for the possibility of a pre-treatment, which is related to the addition of additive, of the meat product being carried out, for example wetting which leads to improved adhesion of a pulverulent additive to the outside of the meat product.

The invention relates in particular to treatments which are covered by the specialist term "marinating" of meat and meat products. The invention also comprises treatments which are covered by the specialist terms "crumbing" and "coating" of meat products.

The additive may be an additive which affects the flavour. As an alternative to or in combination with flavour-influencing properties, the additive may also have other properties, for example may be used to improve the appearance, such as the colour, or the shelf life of the meat product. Furthermore the additive may form an essential part of the structure of the edible product, such as a layer of breadcrumbs on the outside of the meat product. The additive may also be intended to coat the outside of the meat product with a sealing layer. The additive may also have the principal function of increasing the weight of the product.

The additive may also be a disinfecting agent, for example a liquid or a pulverulent substance.

In a particular embodiment, the additive is fat, in particular animal (belly) fat (preferably derived from slaughtered poultry).

The invention relates, inter alia, to the treatment of a meat product, in particular a slaughtered fowl or one or more parts of a fowl of this nature, with an additive, in a position in which the meat product is held securely in place by a product holder which, together with a plurality of similar product holders, can be displaced along a conveyor track and, in the process, moves past an additive-adding station which is arranged alongside the conveyor track and in which one or more additives are added to the meat product.

In a particular embodiment, the conveyor track and the associated drive means for displacing the product holders form part of a slaughtering installation for slaughtering poultry, such as for example that which is marketed by the present applicant.

DESCRIPTION OF PREFERRED EMBODIMENTS

Figure 1:
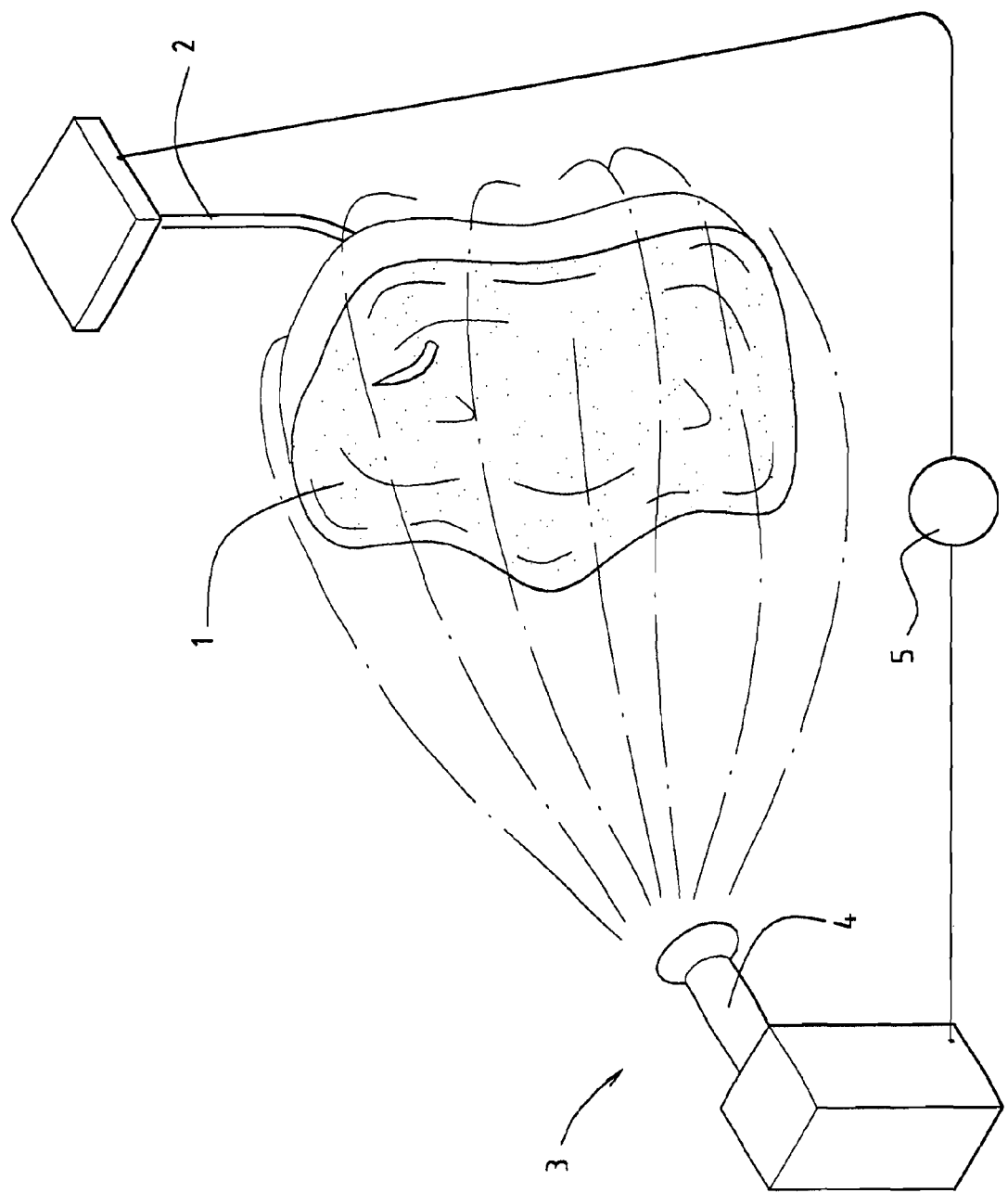
FIG. 1 shows a first exemplary embodiment of the invention.

FIG. 1 shows a meat product 1, which in this figure is shown diagrammatically purely by way of example. The meat product 1 is, in particular, a slaughtered fowl or a part thereof, such as for example an entire chicken or part thereof, such as a chicken leg, wing, breast portion or drumstick. The meat product 1 is situated in an additive-application station 3, which is shown in extremely diagrammatic form and is to be described in more detail below, and is held securely in place by a meat-product holder 2, which is likewise shown only in diagrammatic form and may also be of entirely different design.

In this example shown in FIG. 1, the meat-product holder 2 is of electrically conductive design, for example made from stainless steel, and makes electrically conductive contact with the meat product 1.

The additive-application station 3 comprises an electrostatic additive-application device with one or more jet nozzles 4, which are directed towards the meat product 1, for delivering one or more jets of additive towards the meat product 1, which additive is intended to be applied to the outside of the meat product 1. In this case, the additive comprises small solid and/or liquid particles, which are such that they can be entrained in a gas flow which is emitted from each jet nozzle 4 and is created by means for generating a gas flow which belong to the additive-application station and are not shown.

The station 3 furthermore comprises a high-voltage source 5 which is designed to produce a considerable electrical voltage difference between the meat product 1, on the one hand, and the additive which is to be delivered from the jet nozzle(s) 4, on the other hand. The voltage difference is, for example, a few tens of kilovolts, for example in the order of magnitude of 40 kilovolts.

In this example, the conductive meat-product holder 2 is connected to the negative pole of the high-voltage source 5, or earth, and the additive which is to be delivered is electrostatically charged. The charging is preferably carried out in short pulses.

Due to the electrostatic charge of the additive with respect to the meat product 1, the additive particles are attracted by the meat product 1. It will be noticed that even that side which is remote from the jet nozzles 4 or cavities in the meat products 1 are reached by the additive.

The additive may, for example, be an optionally wetted powder with flavour-influencing properties, such as for example paprika powder, curry powder etc. The additive may also be a liquid, which liquid is then suitably converted into small droplets or a mist and is then electrostatically charged and transferred to the meat product. By way of example, the liquid is a flavour-influencing edible oil, such as for example paprika oil. However, the additive could also, for example, have a disinfecting action or could be a colorant. The additive may also be a mixture of one or more pulverulent and liquid substances.

In a variant embodiment, the meat product 1 is wetted first, and then a substantially pulverulent additive is applied. The wetting may, if appropriate, be effected using another electrostatic application device, which supplies and electrostatically charged liquid mist to the meat product 1. It is possible for the meat product 1 to have been wetted first using water or an aqueous solution, for example as a result of the product being sprayed or passed through a liquid bath. The wetting 1 may serve both to promote the adhesion of the additive to the meat product 1 but also as an activator for the additive, or to activate the additive subsequently as a result of the additive which has then been wetted being heated, for example using a microwave oven.

The wetting prior to the application of a dry additive or the application of a wetted additive may also be combined with a drying treatment of the meat product after the application of the additive, with the result that ultimately additive remains behind on the dried outside of the meat product. This method makes it possible to apply dry additives which do not inherently stick, or stick only with difficulty, to a meat product, yet the outside is dry when the meat product leaves the treatment line.

To stick an additive to a meat product 1, it is also possible for a layer of edible fat to be applied first, for example belly fat from the slaughtered poultry, before the additive is applied. If the meat product is subsequently cooked, the layer of fat contributes to the quality and taste of the meat product, while it is also not necessary to use any cooking butter or oil during preparation. Also, it is possible for only a specific part of the meat product which is to be treated to be provided with a layer of fat or wetted as described above, so that the additive which is then to be applied will stick primarily to that part of the meat product.

If, during electrostatic application of the additive, it is desired to avoid the additive being deposited on a specific component (or components) of the device and/or on a specific section of the meat product to be treated, it is possible for these parts, if they are electrically conductive and are insulated with respect to the meat product which is to be treated, to be electrically connected to the same pole of the high-voltage source as the jet nozzles 4. In this way, it is possible, for example, for walls of the device which are present around the treatment position for the meat product which is to be treated to be protected against undesirable deposition of the additive. It is also possible to use electrically conductive shielding means which are arranged between the jet nozzle(s) and the part which is to be shielded, for example the section of the meat product which is to be shielded, and to be electrically connected to the same pole of the high-voltage source as the jet nozzle(s). In this way, it is possible to treat a selected section of the product with the additive, while another section of the meat product remains free from additive or is only treated with a small amount of additive.

In one possible embodiment, it is possible to provide cleaning means which, for example, remove additive which has been deposited on the product holder 2, preferably before a new meat product 1 is picked up by the product holder 2. Consequently, the new meat product 1 can be treated with a different additive, and it is also possible to prevent cross-contamination.

Figure 2:
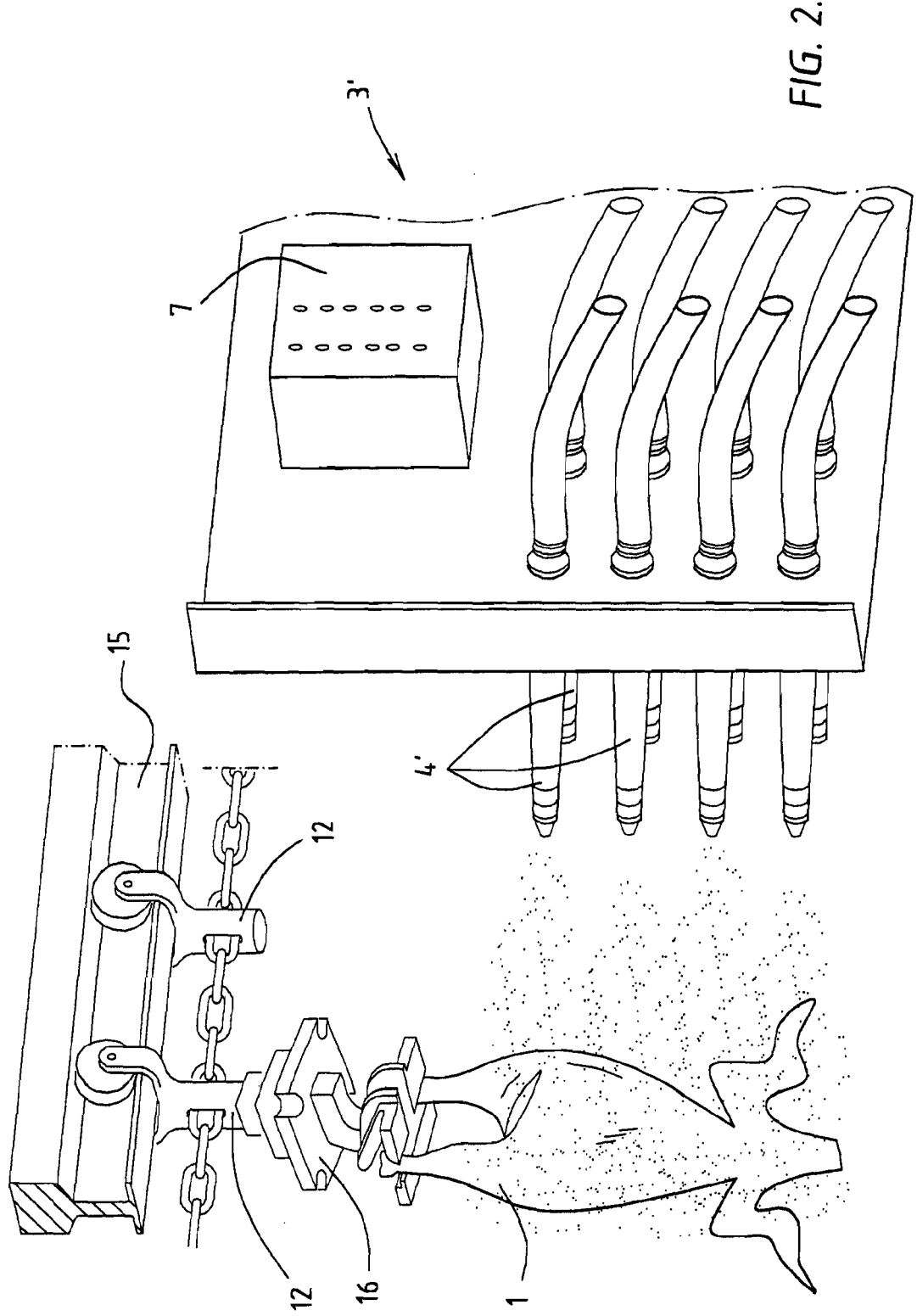
FIG. 2 shows a second exemplary embodiment of the invention.

FIG. 2 shows a meat product 1 which is to be treated, in this case a slaughtered fowl, in particular a chicken, which is hung by its legs in a product holder 12 which is known per se. The product holder 12, together with a plurality of similar product holders 12, one of which is partially visible in FIG. 2, can be displaced along an associated conveyor track 15, driven by suitably designed drive means (not shown)

In an advantageous embodiment, the conveyor track 15 with the product holders 12 form part of a slaughtering installation for poultry, for example as supplied by the present applicant and described in application WO 93/13671. It should be noted that the conveyor track 15 with product holders 12, which is partially shown, is known from the application referred to above. In particular, each product holder 12 is designed to completely encircle the chicken leg or legs which is/or to be held securely below the tarsal joint of each leg, so that the chicken (or the part thereof) is carried hanging downwards.

In the embodiment of this known conveyor track 15 with conveyor holders 12 which is commercially available, the conveyor holders 12 are made largely from plastic material, so that they do not form an electrically conductive connection with the poultry. In order nevertheless to obtain the required electrically conductive connection between the foul 1 which is to be treated and the high-voltage source 5, an electrical conductor with which the fowl comes into contact will be arranged at the treatment point. This will be explained in more detail with reference to FIGS. 4a-c.

FIG. 2 also shows an additive-application station 3' with one or more jet nozzles 4', which in this example deliver a substantially pulverulent additive onto the chicken 1.

In a preferred embodiment, a control device 7, with memory means in which data can be stored relating to the meat product 1 which is held securely by a specific product holder 12, is associated with the conveyor track 15 and the additive-adding device 3'. This data could, for example, comprise the weight of the meat product, the quality of the meat product, for example of the external surface to be treated of the product 1, or data which determines the tenderness which can ultimately be expected of the meat product 1.

In control terms, the control device 7 is coupled to the additive-application device 3', providing a wide range of options. For example, it is possible for each individual meat product 1 which moves past the station 3', where it may stop for a treatment period or simply move slowly past, to be optimally treated with an additive or, if appropriate, a plurality of additives. Furthermore, it is therefore possible to select whether or not to treat a meat product 1 with additive on the basis of the information given by the control device 7. It will also be possible to adapt the amount of additive delivered to the specific meat product 1. It is also possible to make the additive-application device 3, deliver additive only when a meat product 1 which is to be treated is situated at the treatment point along the track, so that no additive is wasted.

In the embodiment shown, the product holder 12, and therefore the chicken 1 which it is carrying, and the jet nozzle (s) 4' can move with respect to one another. This option can be exploited in order to produce a uniform distribution of the additive over the chicken 1 all the way around or, alternatively, to direct only a specific section towards the jet nozzles, while shielding a further part. In the example, the jet nozzles 4' are substantially stationary and the product holder 12 is movable, and in particular the product holder 12 is provided with a rotary member 16 which makes it possible to rotate the chicken 1 about a vertical axis of rotation.

In a variant which is not shown, a controllable robot arm is used to add one or more additives to a meat product, optionally electrostatically. It is also possible to arrange a plurality of jet nozzles, each intended to deliver an associated additive, at a treatment point, so that the product can be treated with a plurality of additives, simultaneously or successively, at this one point. For example, it is conceivable, as a result of a plurality of additives being added, to form a mixture on the surface of the meat product 1.

It would also be possible for different areas of the meat product 1 to be covered with different additives by suitably directing the jet of additive delivered by the associated jet nozzles and/or by using suitable shielding means. Furthermore, it is possible to produce overlapping layers of different additives on the outside of the meat product 1.

It will be clear that these options can also be implemented by arranging a plurality of additive-application stations one behind the other along the conveyor track 15 for the meat products 1 to be treated and guiding the products 1 successively past these stations where they are treated with a specific additive each time.

In a variant, there is provision for a plurality of additive-application stations to be moved successively past a single treatment point for the meat products.

Figure 3:
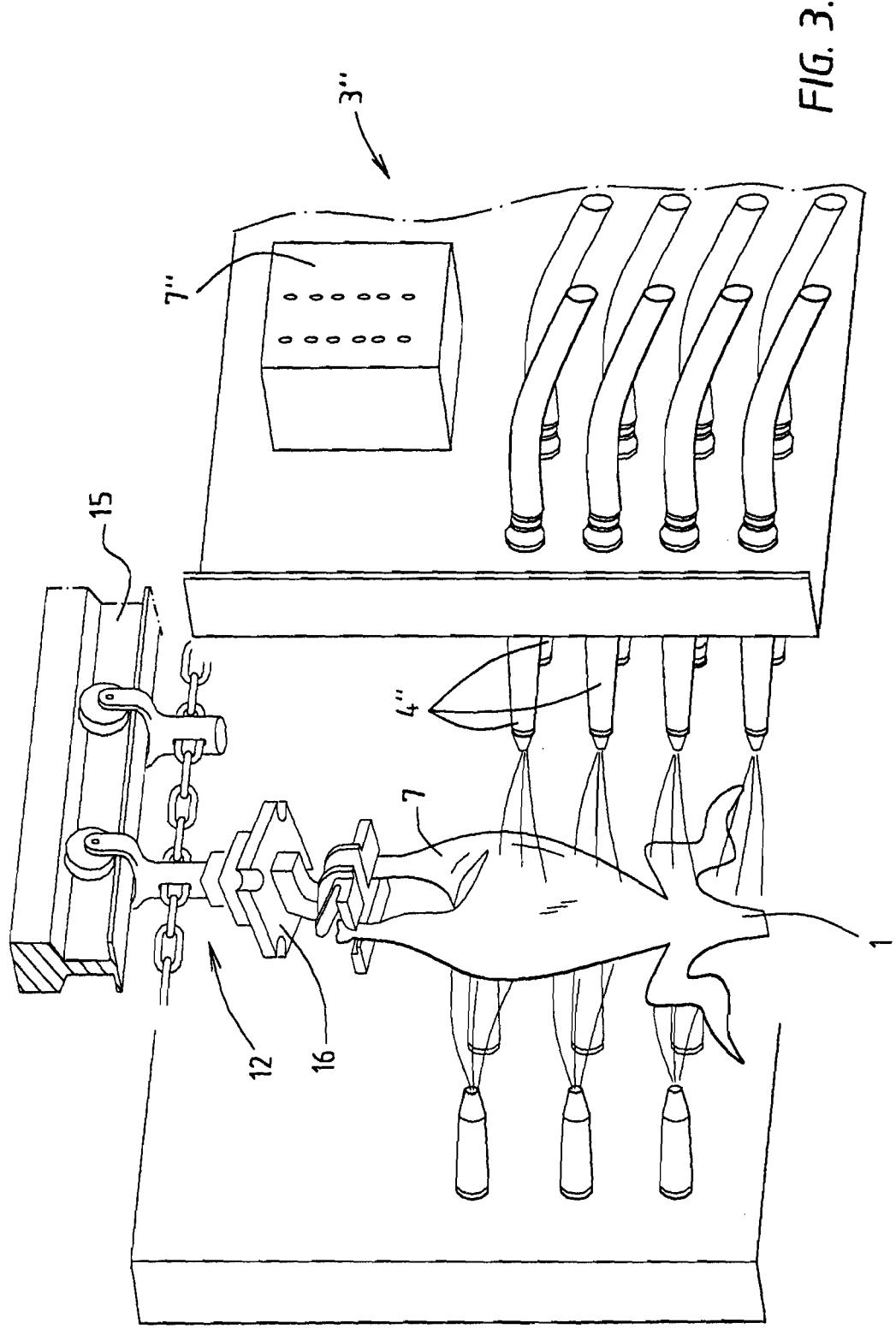
FIG. 3 shows a third exemplary embodiment of the invention.

FIG. 3 shows substantially the same arrangement as FIG. 2, the most relevant difference being that a liquid additive is in this case being applied to the fowl 1 using the electrostatic additive-application device 3". In particular, the additive is a disinfecting additive, and the additive-application device 3" is arranged at a disinfection point along the conveyor track 15 for the fowl 1. Furthermore, it is possible in this case to cause the fowl 1 to rotate, with the aid of a rotary member 16, while the additive is being applied.

Figure 4A:
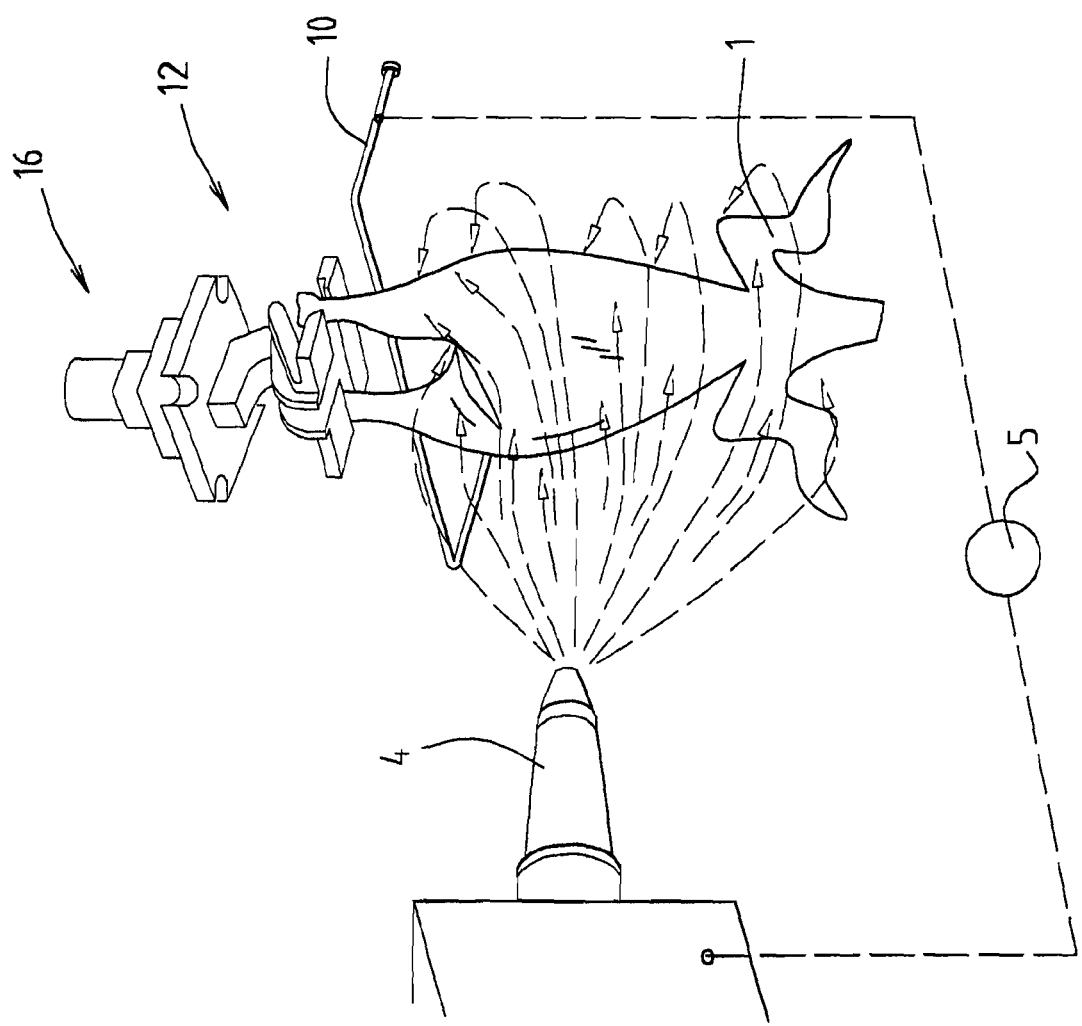
FIGS. 4a-c show a detail of the device shown in FIG. 2 and two variants on this detail.
Figure 4B:
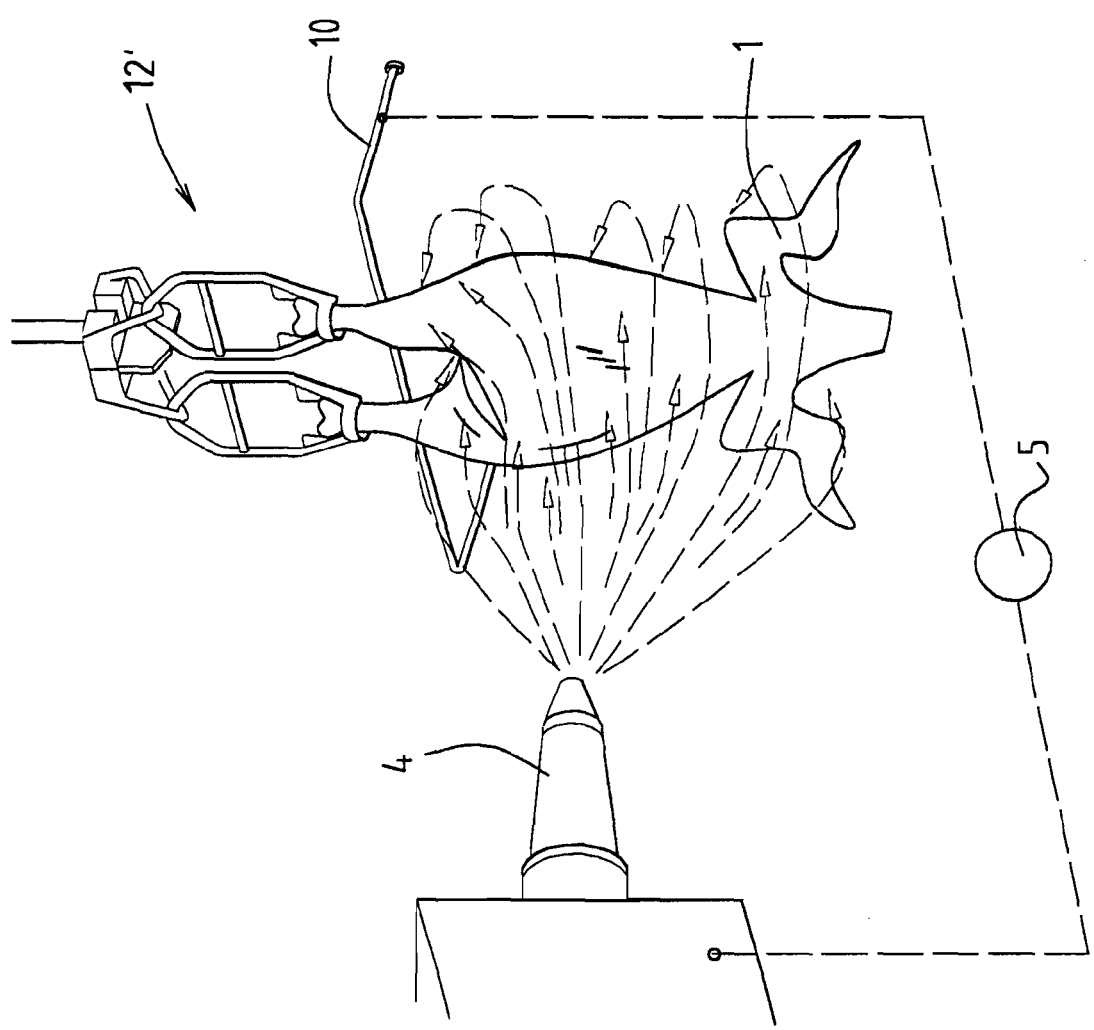
Figure 4C:
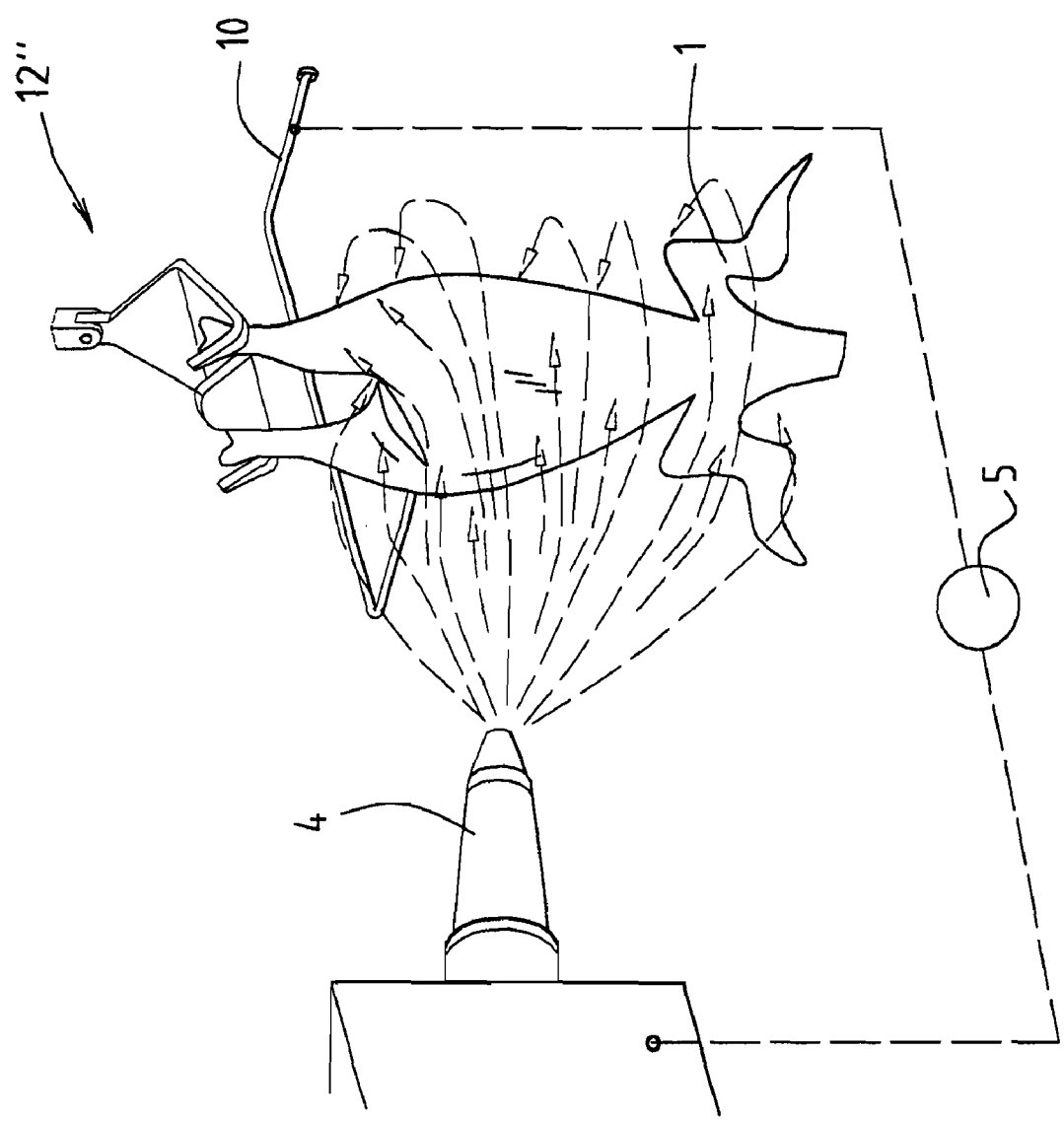

As stated above, the electrostatic application of the additive also leads to additive reaching that side of the meat product which is remote from the jet nozzle(s). FIGS. 4a-c show this effect; electrostatically charged additive is delivered from the jet nozzle 4 towards the meat product 1 which is held securely by product holder 12, 12', 12". In this case, the meat product 1 bears in an electrically conductive manner against an electrical conductor 10 which belongs to the additive-application station and in turn is connected in an electrically conductive manner to a pole of the high-voltage source 5, in particular to earth, while the other pole of the high-voltage source is connected to the jet nozzle 4 for charging the additive particles which are to be delivered. The conductor 10 may be arranged in a fixed position, but may also be movable so that on command it can be brought into contact with a meat product to be treated.

Figure 5:
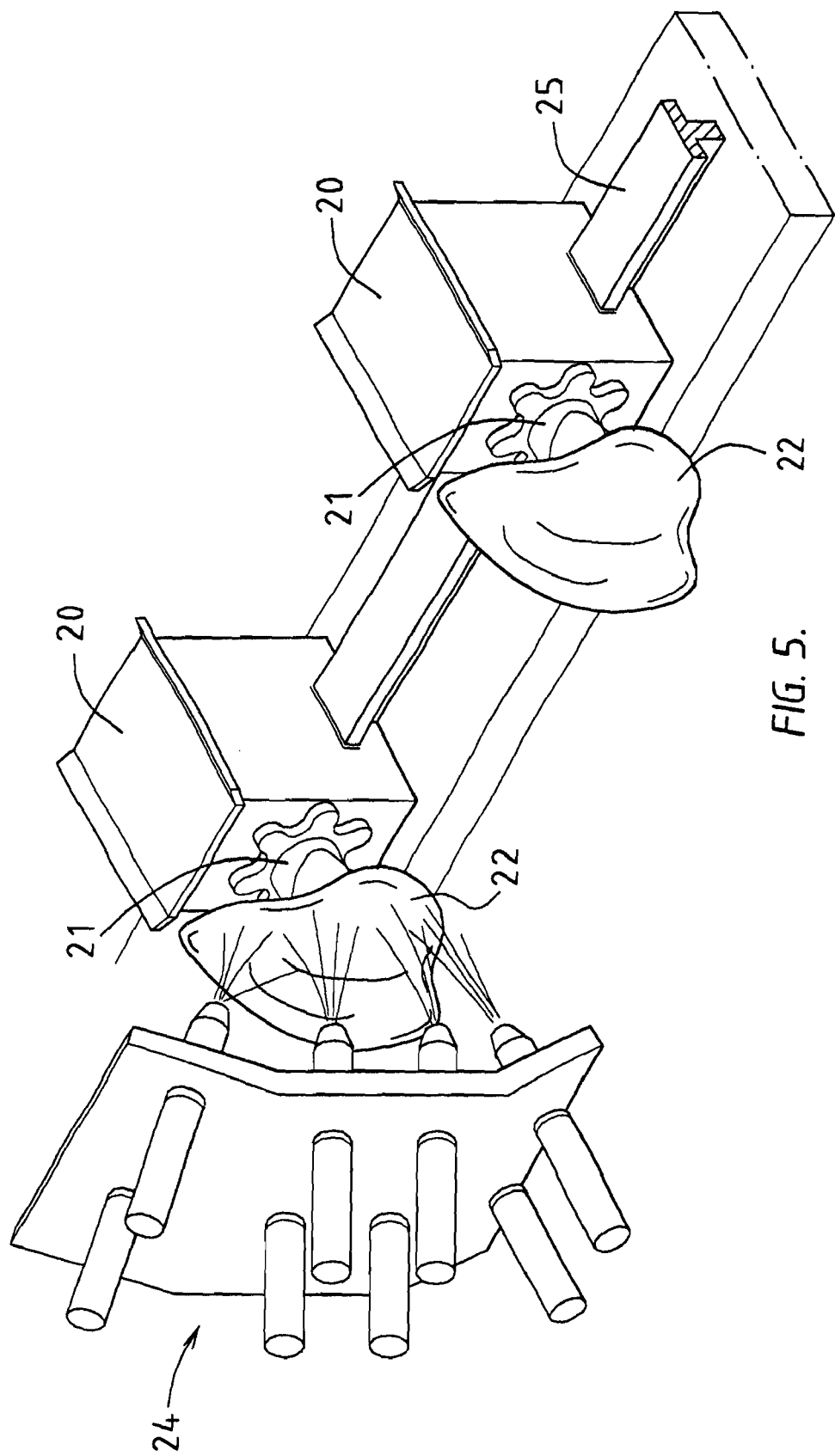
FIG. 5 shows a fourth exemplary embodiment of the invention.

FIG. 5 shows substantially the same arrangement as FIG. 2, but with product holders 20 which are of completely different design and can be displaced along an associated conveyor track 25. These product holders 20 each have a positioning and holding head 21 which can be rotated by associated drive means on the basis of control signals and is designed to hold a specific part 22 of a slaughtered fowl, in this example the breast portion of a chicken, securely in position. For a detailed description of these product holders 20, reference is made to application EP 0 254 332, relevant parts of which are deemed to be incorporated in the present application.

In FIG. 5, the jets of additive delivered are shown to fan out, in order to indicate that the said jets are intended to apply the additive to the surface of the meat product 22. As a variant it is also possible, by means of a high-pressure pump and one or more suitable high-pressure jet nozzles, to deliver very powerful jets of additive which penetrate into the meat product 22 in order in this way to introduce the additive into the interior of the meat product 22.

The additive-application device 24 shown in FIG. 5 is arranged at an additive-application point along the conveyor track 25. The additive-application device 24 may be of the electrostatic type described above, for the electrostatic application of liquid and/or pulverulent additive, for example a flavour-influencing additive, but may also deliver the high-pressure liquid jets referred to above.

Figure 6:
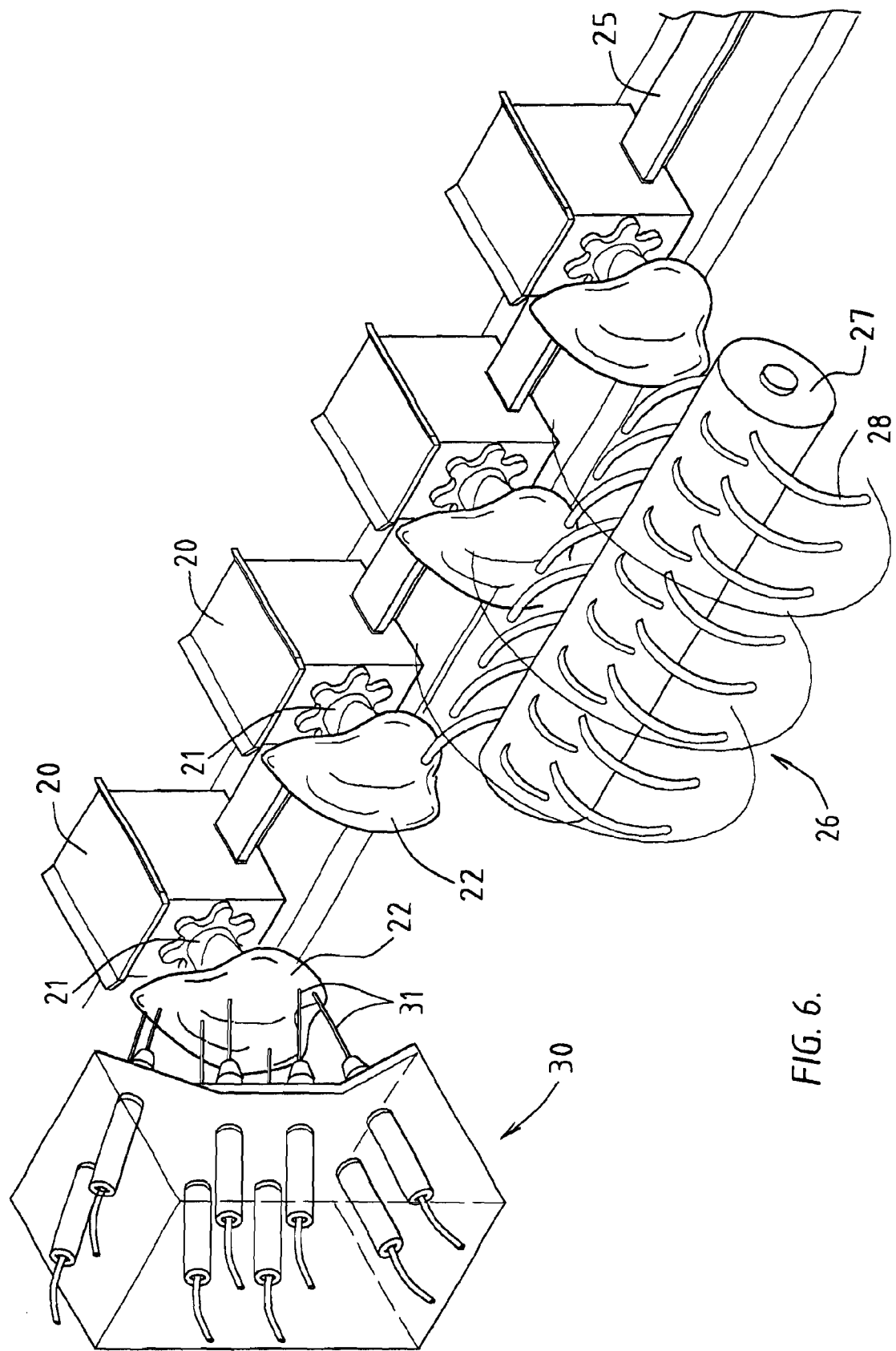
FIG. 6 shows a fifth exemplary embodiment of the invention.

FIG. 6 shows a variant on FIG. 5, in which identical components are denoted by identical reference numerals. The figure also shows an additive-injection device 30, which is designed to introduce the additive directly into poultry 22 or other meat products. For this purpose, the additive-injection device 30 comprises one or more injection needles 31, which are movable with respect to the poultry 22 in order to be able to introduce the needles 31 into the poultry 22. The additive can then be introduced directly into the poultry 22 via the needles 31.

In particular, the displacement of each needle 31 can be adjusted within an associated displacement range, in order in this way to be able to adjust the penetration depth into the meat product 22. Preferably, the penetration depth is adjusted as a function of an earlier observation of the individual meat product 22, the data from which is stored in a control device which is coupled to the additive-injection station 30. By way of example, it is possible to observe the shape and dimensions of the meat product 22, in order in this way to be able to set the correct penetration depth for the needles 31. To determine whether an additive needs to be injected, it is possible, for example, to detect the quality of specific parts of the meat product 22 to be treated.

In a specific embodiment, fat, in particular (belly) fat obtained during slaughter of poultry 22, is injected into the poultry 22 via the needles 31. By individually controlling the needles 31, both with regard to the penetration depth of each needle 31 into the poultry 22 and with regard to the amount of fat which is delivered via the said needle 31, it is then possible to obtain an optimum addition of fat to the poultry. It will thus be possible to locally optimize the fat content of the poultry (part) 22, which is of benefit to the taste and processibility and is also advantageous due to the added value achieved for the fat which is released during slaughter.

After the additive has been injected, it will often be desirable for the meat product to be subjected to a further treatment which is aimed at distributing the additive further within the meat product. This after-treatment may, for example, comprise massaging of the meat product. For this purpose, FIG. 6 shows massaging means 26 which are of mechanical design and are arranged along the conveyor track 25, downstream of the additive-injection means 30. The massaging means 26 in this case comprise a rotatable shaft 27 which is positioned alongside the conveyor track 25 and is provided with flexible but firm massaging projections 28. When the shaft 27 rotates, the massaging projections 28 rub intensively over the meat product, in such a manner that the additive is distributed. Obviously, other massaging means may also be used.

For example, it is conceivable for the meat to be massaged by blasting small particles onto the meat product to be massaged at a considerable velocity, as a type of hail. The combination of the mass of the particles and the speed of the particles then produces a mechanical massaging action. In an alternative variant, particles of this nature can be blasted against the meat product at the same time as the additive is being applied, for example, particles which are not electrostatically charged and are then entrained in the gas flow which also entrains the additive particles or droplets which are electrostatically charged.

Massaging of the meat product can also be achieved by directing powerful air jets at the meat product, which air jets, if appropriate, may also entrain an additive.

Figure 7:
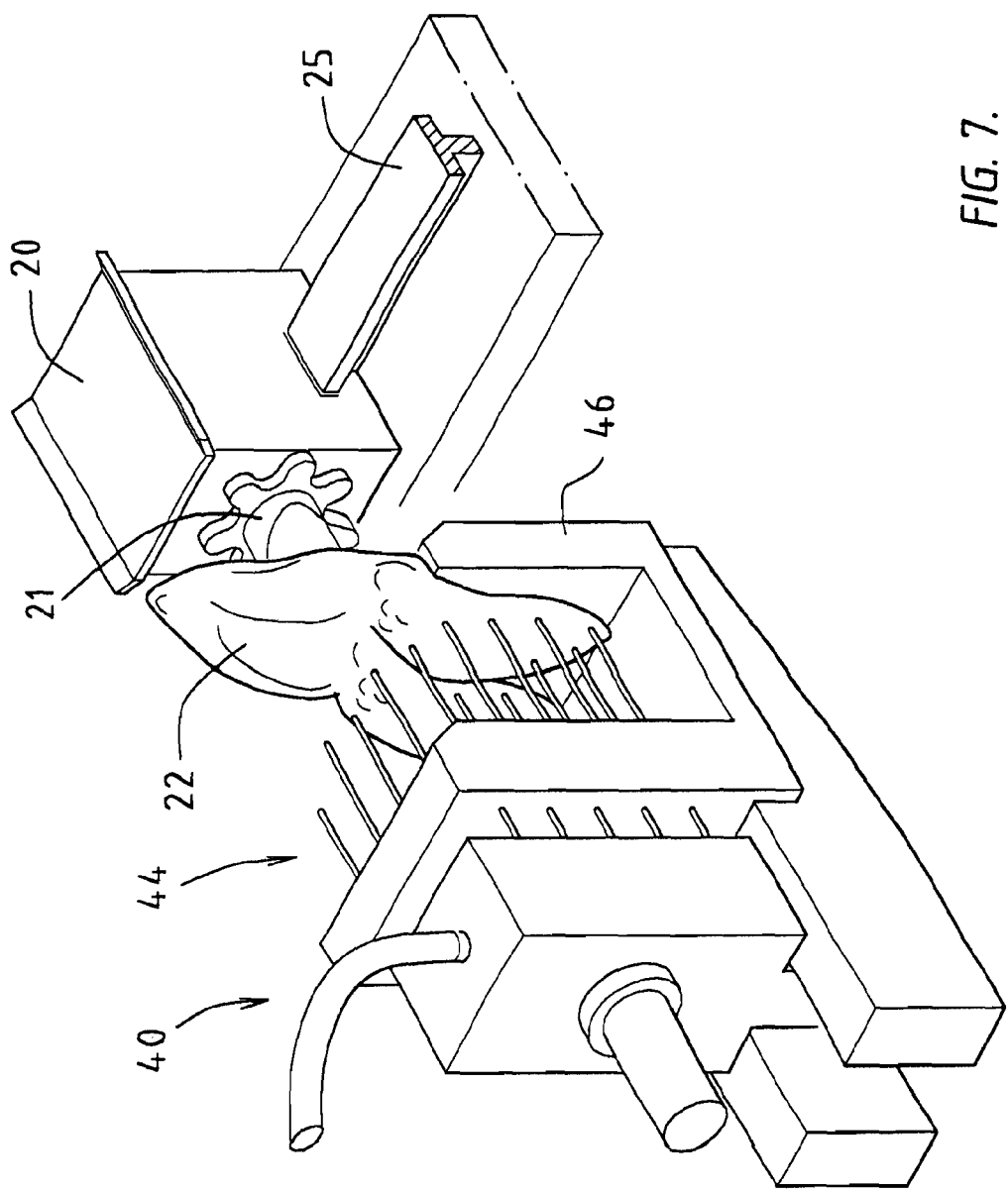
FIG. 7 shows a sixth exemplary embodiment of the invention.

FIG. 7 shows an additive-injection device 40 which is arranged alongside the conveyor track 25 and has one or more injection needles 44 for injecting additive into that part of a slaughtered fowl 22 which is to be treated. In particular, this embodiment relates to the treatment of breast portions of chicken or similar poultry, which breast portions have a membrane on one side. In this case, it would represent a drawback if injection needles were to penetrate through the said membrane, particularly since this is subsequently visible to the consumer, and for this reason, this injection is only carried out when the breast piece, as shown, has been separated (by separation means which are not shown but are known per se), so that the side with the membrane is turned away from the needles 44. In this case, there is a retaining member 46 in order to hold the breast portion on the side which is remote from the needles 44.

In this variant too, it is possible for the needles 44 to be individually adjustable with regard to their penetration depth and/or delivery of additive. Furthermore, it is also possible for an after-treatment, for example a massaging treatment, to then take place downstream of the additive-injection point.

Figure 8:
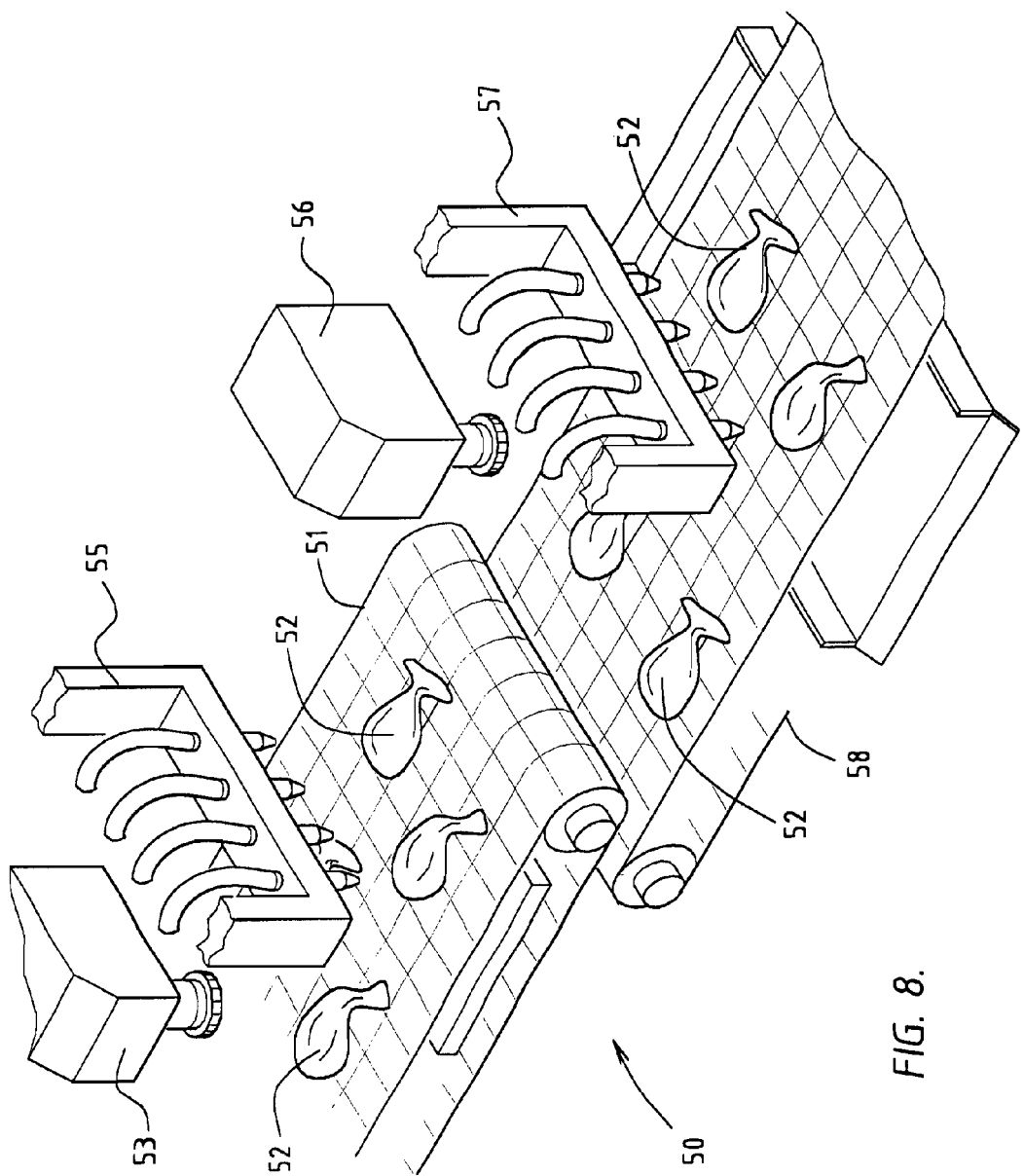
FIG. 8 shows a seventh exemplary embodiment of the invention.

FIG. 8 shows an installation for the external application of additive to meat products, in particular to damageable meat products which have been formed from a mass of pounded meat, such as for example hamburgers.

The installation comprises a conveyor mechanism 50 with a first conveyor belt 51 for (meat) products 52 which are to be treated, for example chicken wings. The installation comprises a camera 53 for detecting the products 52, preferably in such a manner that the position on the belt 51 is observed, and preferably also in such a manner that the shape and/or dimensions of the product 52 are observed.

A first additive-application device 55 is used to apply a first additive. This is preferably carried out electrostatically, in which case the belt 51 is electrically conductive, for example is made from metal gauze, and is connected to earth. Preferably, the first additive is applied on an individual basis, i.e. in such a manner that each product is given precisely the required amount of additive, if appropriate, in the case of directable jet nozzles, at a specific location. This determination of the amount and/or location is preferably carried out on the basis of parameters which are observed by the camera 53.

After the first additive-application device 55, the meat products 51 are turned through dropping onto a second conveyor belt 58. Above the said second conveyor belt 58 there is a second camera 56, which detects the products 52 again, but in this case from the other side. By way of example, the camera 56 protects the position on the belt 58. The camera 56 or an additional camera, could also be directed at the belt 52 in order to detect the quality and/or quantity of the earlier application of the first additive.

A second additive-application device 57 can then, if appropriate on the basis of the observation carried out by the camera 56, deliver individually determined amounts of additive to the products 51 which are moving past.

By using shielding means between the jet nozzles and the meat products which are to be treated, it is possible to ensure that one or more specific parts of the meat products to be treated are shielded from the application of additive.

Figure 9:
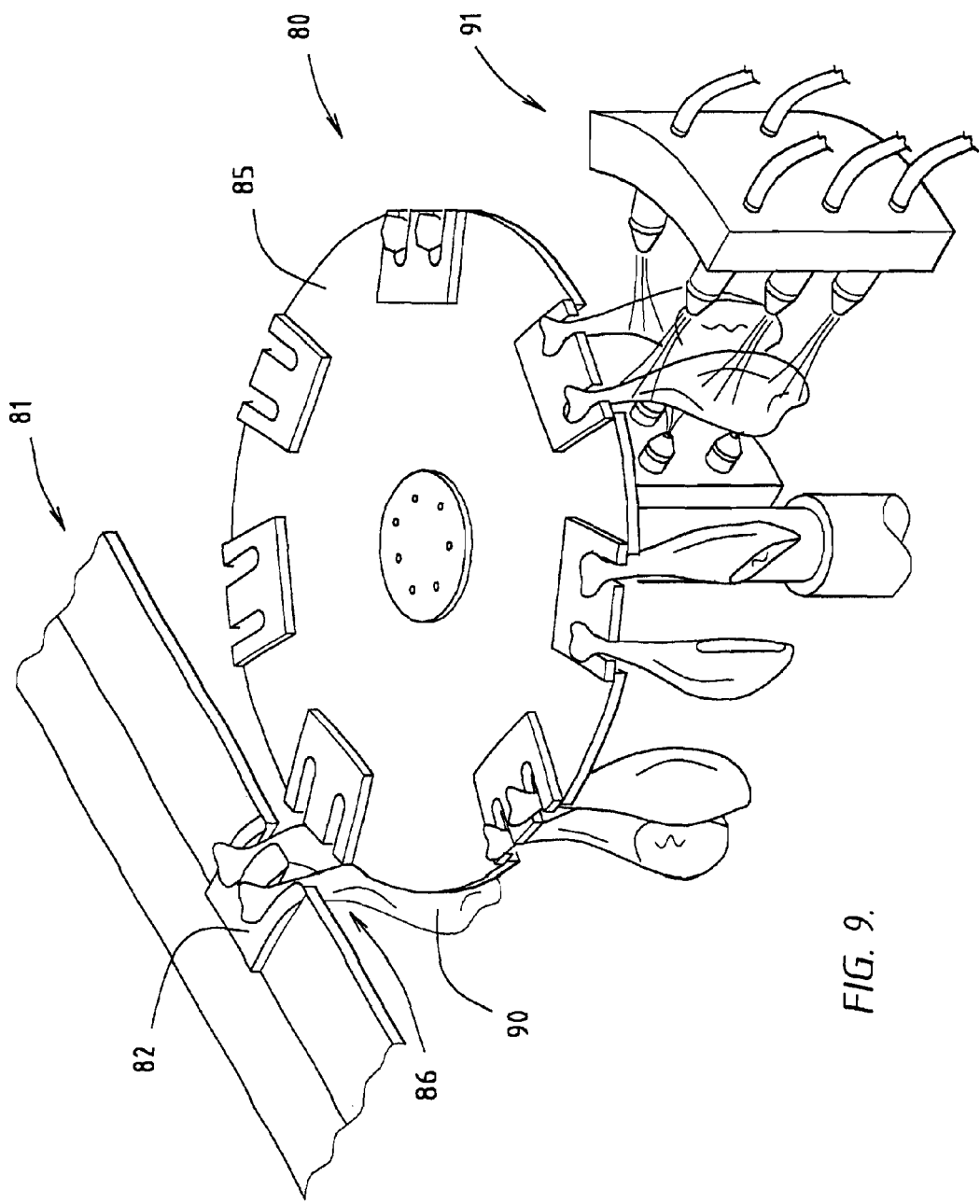
FIG. 9 shows an eighth exemplary embodiment of the invention.

FIG. 9 shows an additive-application installation 80 which is integrated with a conveyor device 81 for slaughtered poultry 90 or parts thereof, with product holders 82 which can be displaced along an associated conveyor track, in this case for securely holding two chicken legs each.

The installation 80 comprises a second conveyor device 85, which at a transfer point 86 is able to take over meat products from the conveyor device 81. The conveyor device 85 forms a second track for the meat products 90, along which second path one or more additive-adding stations 91, for example an electrostatically operating station, are arranged. After one or more additives have been added, the conveyor device 85 guides the meat products 90 which have been treated back to the conveyor device 81 and transfers the treated meat products 90 back to the associated product holders 82.

Suitable control means make it possible to ensure that only meat products which are to be treated are transferred to the second conveyor device 85, while other products, which are not to be treated, are conveyed onwards along the first track. By setting a suitable speed and track length of the second conveyor device 85, it is possible to obtain a sufficient processing time for applying and/or injecting additive. It is also possible to dry the meat product which has been provided with additive.

It will be clear that a second conveyor device of this nature, with one or more associated additive-adding stations, can be incorporated in existing installations in which meat products are conveyed by a conveyor device. Furthermore, it will be clear that the detection described with reference to FIG. 8, for example of the shape, the quality and the application of additive, can also be carried out in an installation as shown in FIG. 9.

Figure 10:
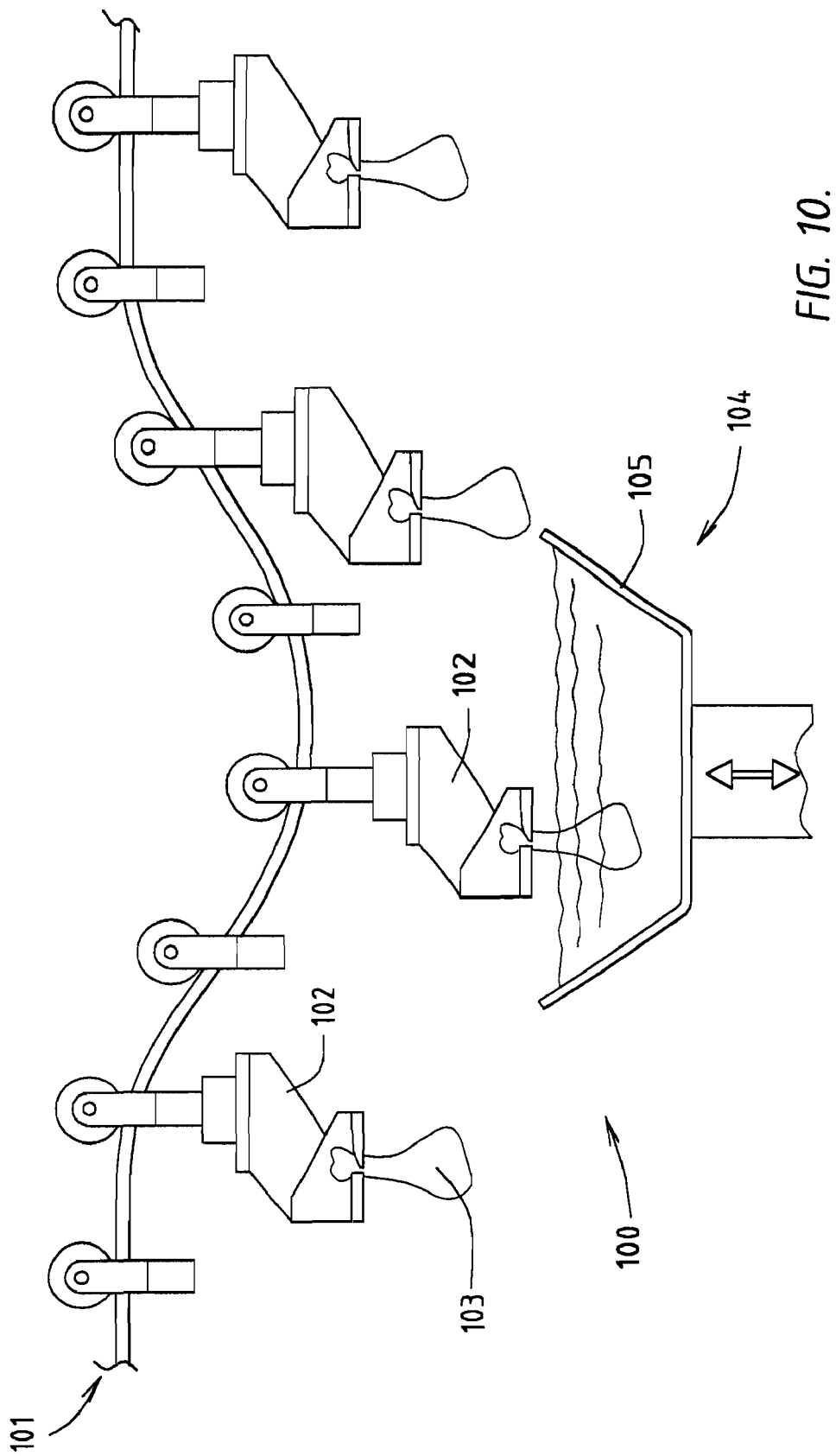
FIG. 10 shows a ninth exemplary embodiment of the invention.

FIG. 10 shows an additive-adding installation 100, in which a conveyor track 101 is provided with a plurality of product holders 102, which are designed to carry slaughtered poultry 103 or parts thereof. An additive-adding device 104 is arranged along the conveyor track 101, at an additive-adding position. This device 104 comprises a movable bath 105 containing a liquid which serves as an additive. The bath 105 can be displaced on command, by drive means (not shown), between a position which lies outside the path of the products 103 which are carried by the product holders 102, and a position in which the products 103 enter the bath 105 and are completely or partially submerged in the liquid. In an alternative variant, the bath 105 contains a pulverulent additive, which powder is optionally fluidized as a result of air being blown through it.

Figure 11:
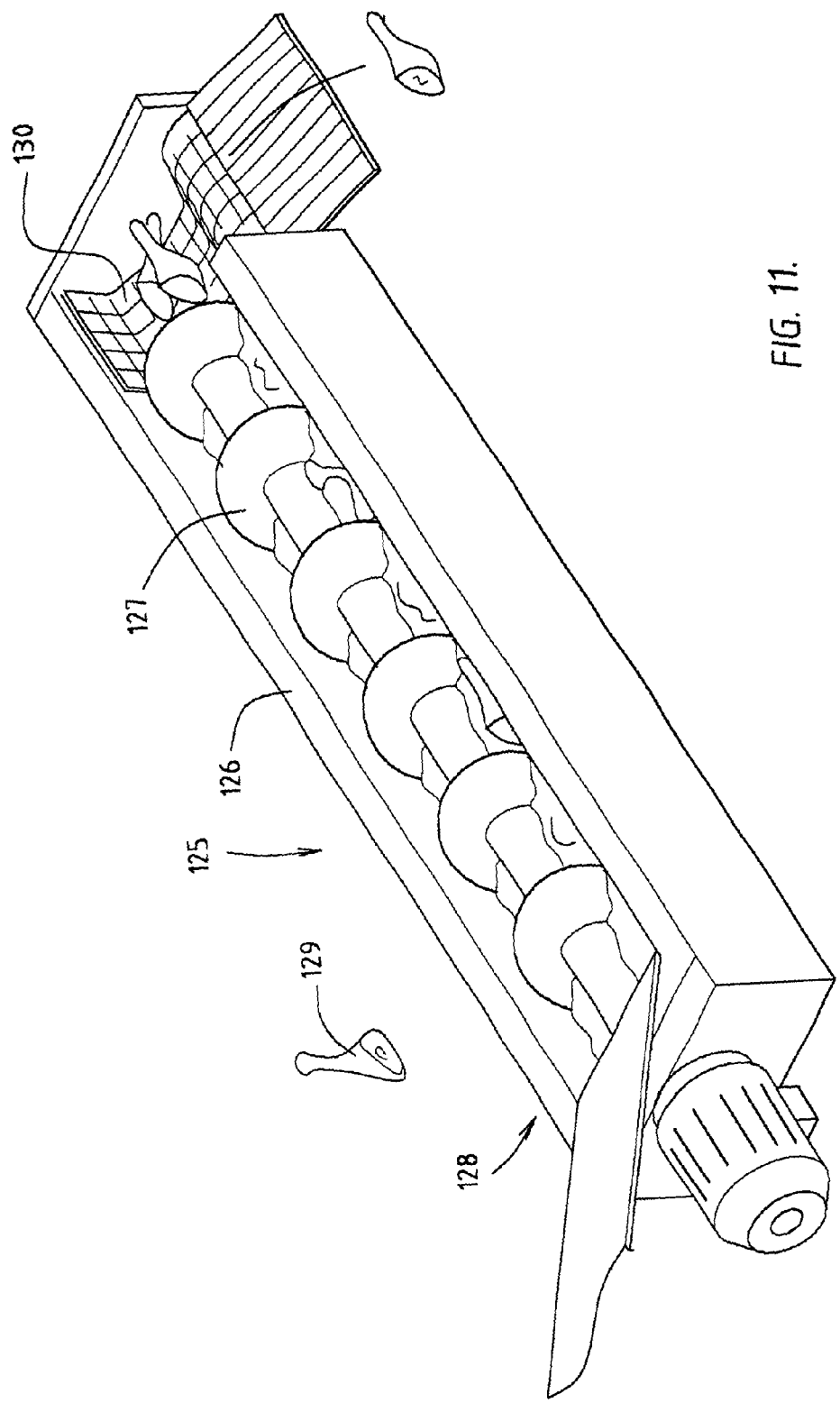
FIG. 11 shows a tenth exemplary embodiment of the invention.

FIG. 11 shows an additive-adding installation 125 with a bath 126 which holds a liquid or pulverulent additive, in particular a flavour-influencing marinade. Furthermore, the bath 126 contains a rotatable conveyor worm 127. At position 128, meat products 129 which are to be treated enter the bath 126, preferably one by one. The worm 127 conveys the products 129 through the bath 126 to the removal position 130.

In a preferred embodiment, controllable agitation means are provided for agitating, i.e. setting in motion, the additive, in addition to the conveyor worm 127 which has already been described, so that the agitation is not based exclusively on the rotation of the worm 127 and the resultant movement of the products. If, in combination with this measure, the drive means of the conveyor worm 127 are designed in such a way that the rotational speed of the worm 127 is also controllable, it is possible to bring about optimum treatment of the meat products 129 with the additive. It is then possible, given a decreasing feed of products 129 to the device 125, to reduce the speed of the conveyor worm 127, in order to maintain an optimum level of loading of the worm 127, which is necessary since the interaction of the meat products is partially responsible for the marinating. It is then also possible, since the residence time of the meat products 129 in the bath 126 increases, to regulate the action of the agitation means in such a manner that ultimately the quality of the marination of the meat products remains uniform. The agitation means may, for example, be designed to form air bubbles in the bath.

Figure 12:
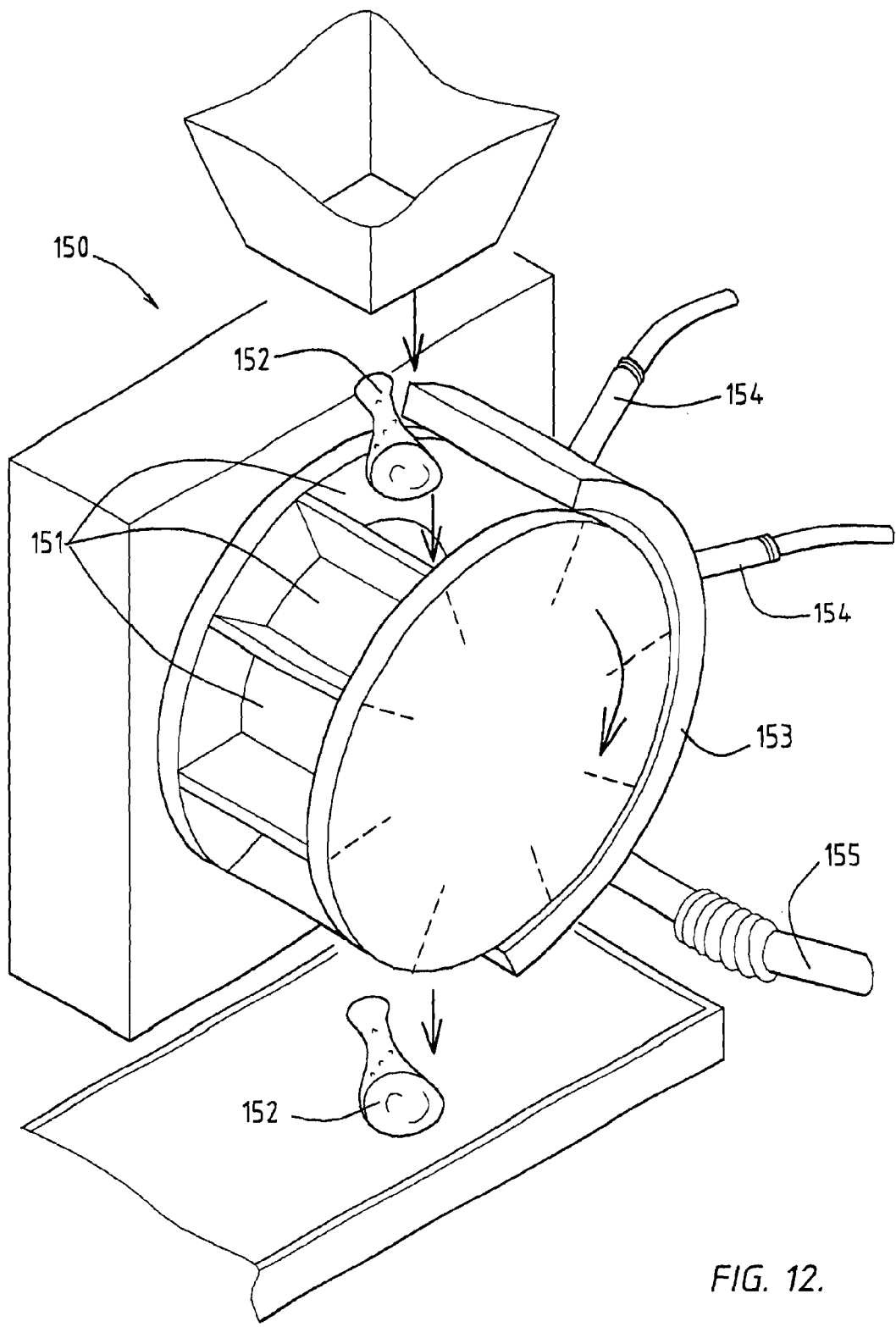
FIG. 12 shows an eleventh exemplary embodiment of the invention.

FIG. 12 shows an additive-adding installation 150 with holding chambers 151 for the (meat) products 152 to be treated, which chambers can move along an associated path. By way of example, each chamber 151 may hold one or more products 152. Closure means 153 are arranged along the path of chambers 151, which closure means close off the chamber 153 from the environment for a specific period. When the chambers 151 are closed, additive is applied to the products 152 which are enclosed in the chambers 151 by additive-adding means 154. Any surplus additive is removed from the chamber 151, which is preferably still closed, via a discharge means 155, after which the chamber 151 opens and the treated product 152 is removed.

Although a defined amount of additive can be accurately added to one or a few meat products in a chamber using the installation shown in FIG. 12, to achieve good marination it will be desirable for the meat products which have been provided with additive to be subjected to a treatment which brings about further distribution of the additive within the meat product, for example in such a manner that the additive penetrates into the meat to a certain extent. This treatment may comprise the mechanical massaging of the meat, but could also use sound or other vibratory means, if appropriate with air jets which are directed at the meat product. It will be clear that after-treatments of this nature carried out on the meat provided with additive are also possible in the solutions mentioned with reference to the figures described above.

Figure 13:
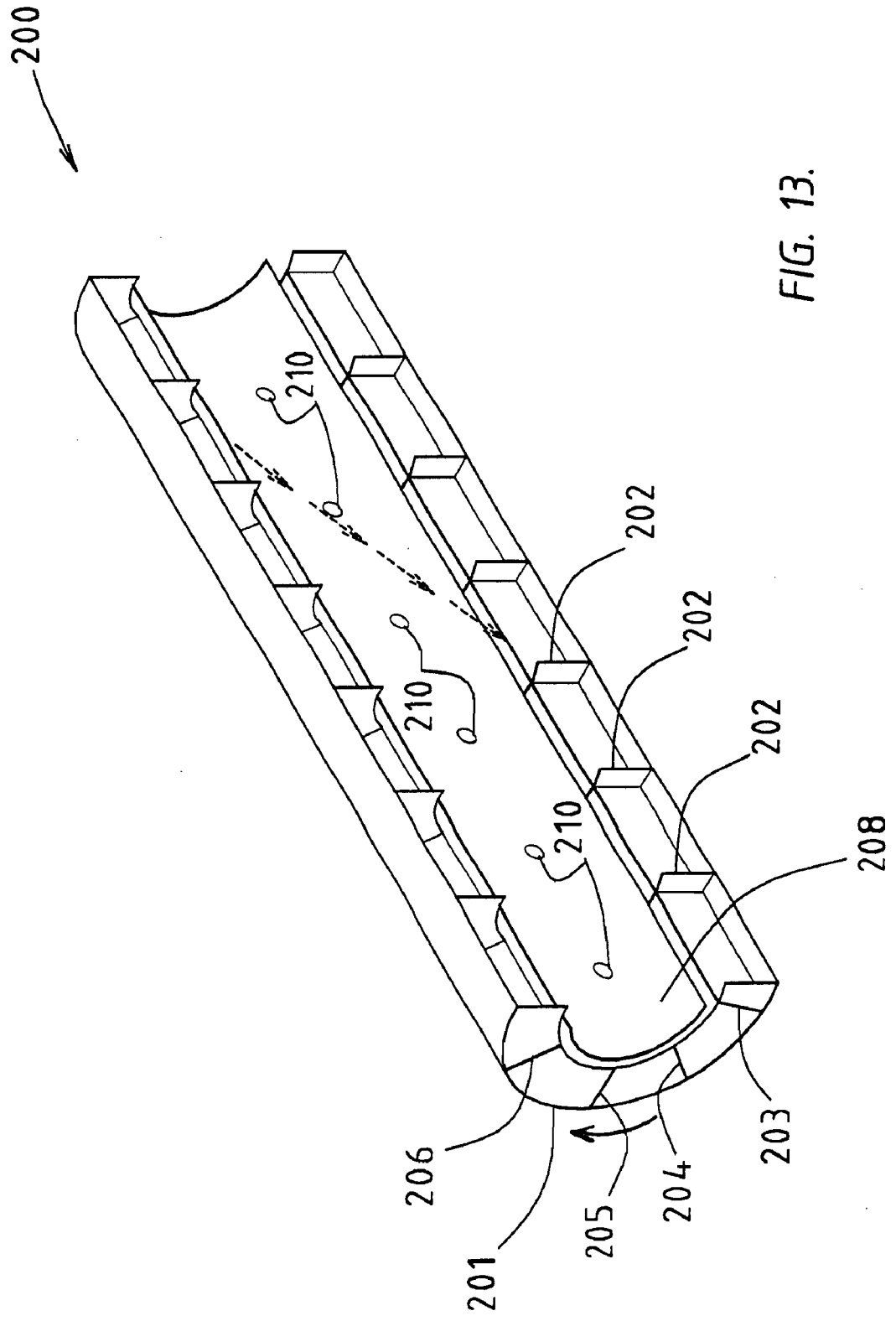
FIG. 13 shows a twelfth exemplary embodiment of the invention.

FIG. 13 shows an additive-adding device with strong mechanical massaging of the meat. The device 200 comprises a tubular drum 201 with annular baffles 202 which are arranged at an axial distance from one another on the inner side and delimit annular spaces between them. These annular spaces are in turn sub-divided into chambers by longitudinal baffles 203-206 which are distributed over the circumference on the inside of the drum 201. The drum 201 can be rotated about its longitudinal axis, in the direction of the arrow, by drive means (not shown). Along the inside of the baffles 202-206 there is a covering wall 208 which closes off the chambers on the inside over part of the internal circumference, in such a manner that meat products can be introduced into the chambers at the bottom and are then guided upwards by rotation of the drum 201, after which the chambers open again at the top side and the meat products fall downwards. If the drum 201 is arranged at an angle to the horizontal, it is possible to ensure that the downwardly falling meat products enter a chamber which belongs to a subsequent annular space, so that the products are thus conveyed axially through the drum, during which movement they are repeatedly conveyed upwards for a period and then fall back downwards.

It is possible for an additive to be added to the chambers by additive-adding means 210 at the moment at which the chambers are closed by the covering wall 208.

Figure 14:
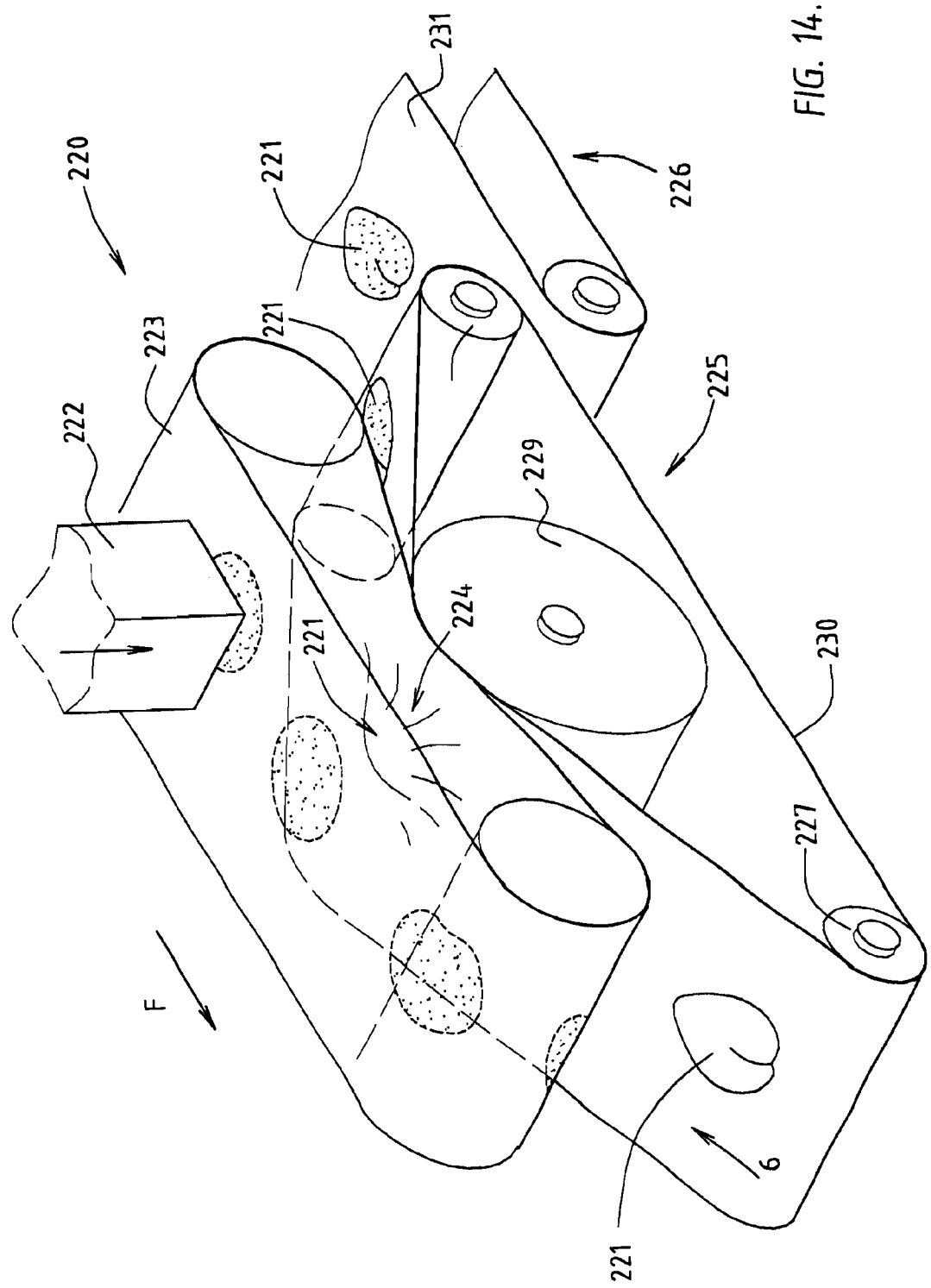
FIG. 14 shows a thirteenth exemplary embodiment of the invention.

FIG. 14 shows an additive-application device 220 for applying an additive to the outside of meat products 221, for example to breast portions of chicken, as shown in the figure. In the device shown in FIG. 14, the additive is not applied to the meat product direct from a reservoir, as in the devices described above, but rather via an intermediate substrate. FIG. 14 shows an application member 222 which is arranged along an endless intermediate substrate belt 223. With the aid of the application member 222, it is possible to deliver a metered amount of additive, which is adapted to a meat product 221, onto the intermediate substrate belt 223. The intermediate substrate belt 223 is guided over associated rollers 223a and 223b and can be moved onwards in the direction of arrow F by drive means (not shown). The metering of the additive onto the belt 223 is preferably adjustable, and can preferably be adapted to the meat product 221 which is to be treated with this metered quantity of additive. Preferably, the weight or the volume of each metered quantity of additive can be adjusted. In a further variant, it is possible to provide for adjustment of the form in which the additive is metered onto the intermediate substrate belt 223.

At a location downstream of the application member 222, a contact point 224 is arranged along the belt 223, at which contact point 224 the meat product 221 to be treated is brought into contact with that location on the belt 223 which has been provided with a metered quantity of additive. In this way, the additive is applied to the meat product 221 due to contact between the meat product 221 and the additive on the belt 223. In FIG. 14, the meat products 221 which are to be treated are guided along the intermediate substrate belt 223 by a conveyor device 225, in such a manner that a meat product 221 is pressed onto the contact point 224 in the belt 223, resulting in elastic deformation of the belt 223, as shown in the figure. After the contact point 224 has been passed, the meat product 221 moves back out of the path of the belt 223 and, having been provided with the externally supplied additive, is then removed with the aid of a suitable removal means 226.

In FIG. 14, the conveyor device 225, comprises an endless conveyor belt 230 with a front roller 227, a rear roller 228 and also a pressure-exerting roller 229. There are also drive means (not shown) which are able to move the conveyor belt 230 in the direction indicated by arrow G. The pressure-exerting roller 229 is arranged in such a manner that the meat product 221, when it passes the pressure-exerting roller 229, is pressed into the path of the belt 223. The removal means 226 in this case also comprises a conveyor belt 231 with associated rollers and drive means.

If necessary, it is possible to provide cleaning means which are designed to clean the intermediate substrate belt 223 downstream of the contact point 224.

The device 220 shown can be used to apply additive in paste form, for example a sticky flavour-influencing additive. In an alternative variant, it is possible for the additive to be applied to the intermediate substrate belt 223 electrostatically, approximately in a similar way to certain photocopying machines. The transfer of the additive from the intermediate substrate belt 223 to the meat product may also be electrostatically assisted.

It should be noted that the endless belt 223 forms only one possible embodiment of the intermediate substrate for the additive; other embodiments, for example with a carousel on which a plurality of intermediate substrates, each for a single metered quantity of additive, are held, are also possible.

Figure 15:
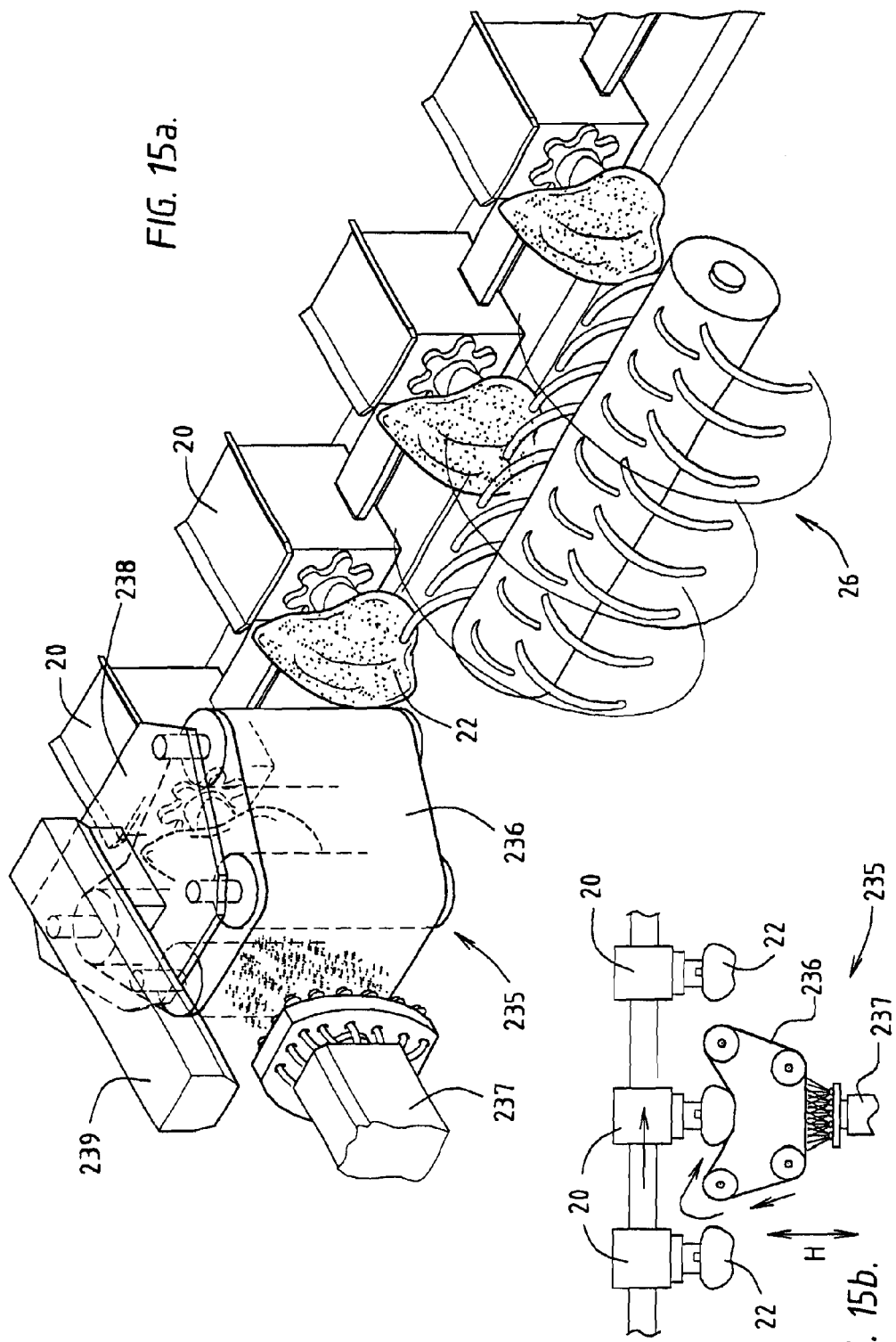
FIGS. 15a and 15b show a fourteenth exemplary embodiment of the invention.

FIGS. 15a and 15b respectively show a diagrammatic, perspective view and a partial plan view of the arrangement from FIG. 6, but with an additive-application station 235 which is yet to be described illustrated instead of the additive-injection station 30.

The additive-application station 235 comprises an endless intermediate substrate belt 236 and an electrostatic additive-application device 237, by means of which additive can be electrostatically deposited on the intermediate substrate belt 236. The belt 236 is guided by associated rollers and by means of these rollers is accommodated in a movable frame 38. The frame 238 can move to and fro transversely with respect to the meat products 222 which are carried by the holding members 20, which movement is denoted by arrow H in FIG. 15b. If appropriate, the application device 237 moves with the frame 238, which in this case is supported by guide 239. A suitably designed control device ensures that when a meat product which is to be treated is present on or in the vicinity of the contact point along the path of the holding members 20, the belt 236 is pressed against the meat product 22 which is to be treated. In the process, the additive which has been applied then comes into contact with the meat product and is completely or partially transferred to that side of the meat product which is to be treated.

The additive may, for example, be a pulverulent additive, for example in order to enhance the flavour of the meat product, although other additives for other purposes are, of course, also possible. It is also possible for the additive to be applied to the intermediate substrate 236 other than by electrostatic means, for example by spraying on an adhesive additive.

It will be clear that as an alternative to the belt 236, it is also possible to use other intermediate substrates, for example a roller with an elastically compressible outer surface or a disposable film, or to use the belt in combination with a disposable film.

Figure 16:
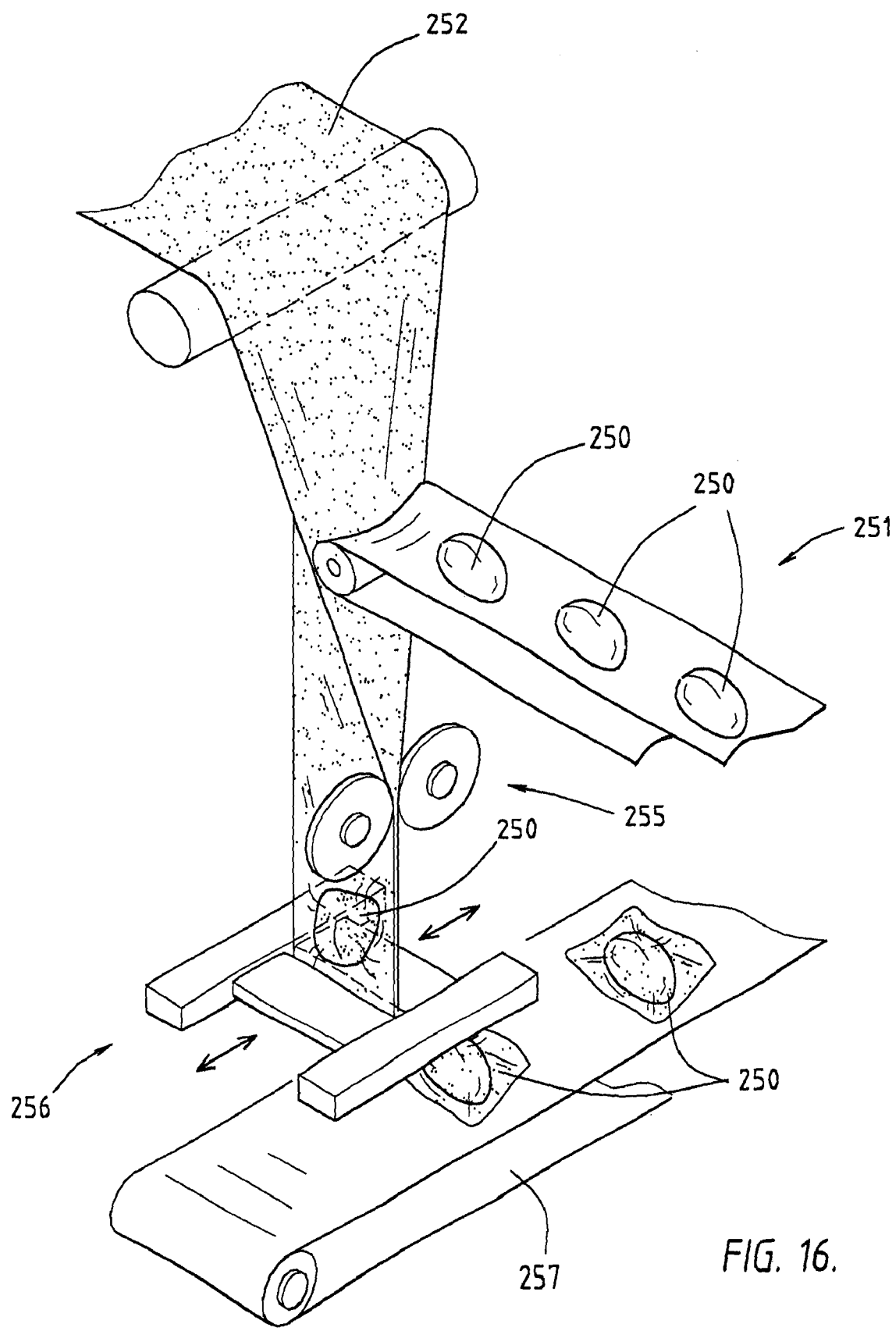
FIG. 16 shows a fifteenth exemplary embodiment of the invention.

FIG. 16 shows another solution for applying additive to meat products 250. This solution is based on the additive being applied to the packaging of the meat product 250 and on contact between the packaging and the meat product transferring the additive to the outside of the meat product 250. During the course of the period for which the meat product 250 is packaged, the additive will in many cases be able to penetrate into the meat product 250 and be distributed in the intended way.

In a particularly advantageous embodiment, the additive is applied to a packaging substrate, in particular to a (plastic) packaging film. In an advantageous embodiment of this arrangement, the additive is applied to the packaging film by electrostatic means. In a further advantageous embodiment, the meat product is tightly surrounded by the packaging substrate which has been provided with additive, for example as a result of a vacuum being applied to the packaging or as a result of the packaging being heat-shrunk around the meat product. In a further variant, it is not the complete packaging substrate, but only specific parts thereof which are provided with additives, and it is ensured that that part of the meat product which is to be treated bears against that area of the packaging substrate which is provided with additive. It is also conceivable for different areas of the packaging substrate to be provided with different additives or with the same additive in a different metered quantity.

In the example shown in FIG. 16 the meat products 250 are supplied by a supply means 251, in this case a conveyor belt. The figure also shows a web of packaging film 252, which packaging film 252 has been pre-treated with an additive, for example a flavour-enhancing additive or a preserving additive. The web of packaging film 252 is guided into a fold and the meat products 250 are introduced into the fold and are thus enclosed within the film 252. The edges of the film 252 are then welded together using an edge-welding device 255. A transversely running parting weld is formed along the folded web of film by means of a parting-welding device 256, so that each meat product or a group of meat products is completely enclosed in the film 252. If appropriate, a vacuum can be applied to the packaging obtained, so that the film 252 bears taut against the meat product. The packaged meat products are removed via a removal means 257.

If appropriate, it is possible that the material referred to here as packaging substrate may not be suitable as packaging for the consumer, in which case the meat product which has been packaged in the said substrate which is provided with additive is transferred into another packaging, an outer packaging. This outer packaging may also comprise a plastic film, and it is possible to make this film airtight, while the substrate provided with additive may if appropriate be porous, for example in the form of a nonwoven or woven fabric. Furthermore, it is possible that the packaging material which has been provided with additive may not completely surround the meat product, particularly in those cases in which an additional packaging is arranged around it.

In an alternative variant, it is possible to use a film which in fact comprises two layers between which the additive is arranged, for example only in certain areas, in which case one of the two layers is removed before the meat product is packed inside it, so that the additive is exposed and comes into contact with the meat product, so that it can be transferred to the meat product, for example in order to enhance the flavour. The invention also relates to a film of this nature and to the use of a film of this nature for packaging meat products.

Figure 17:
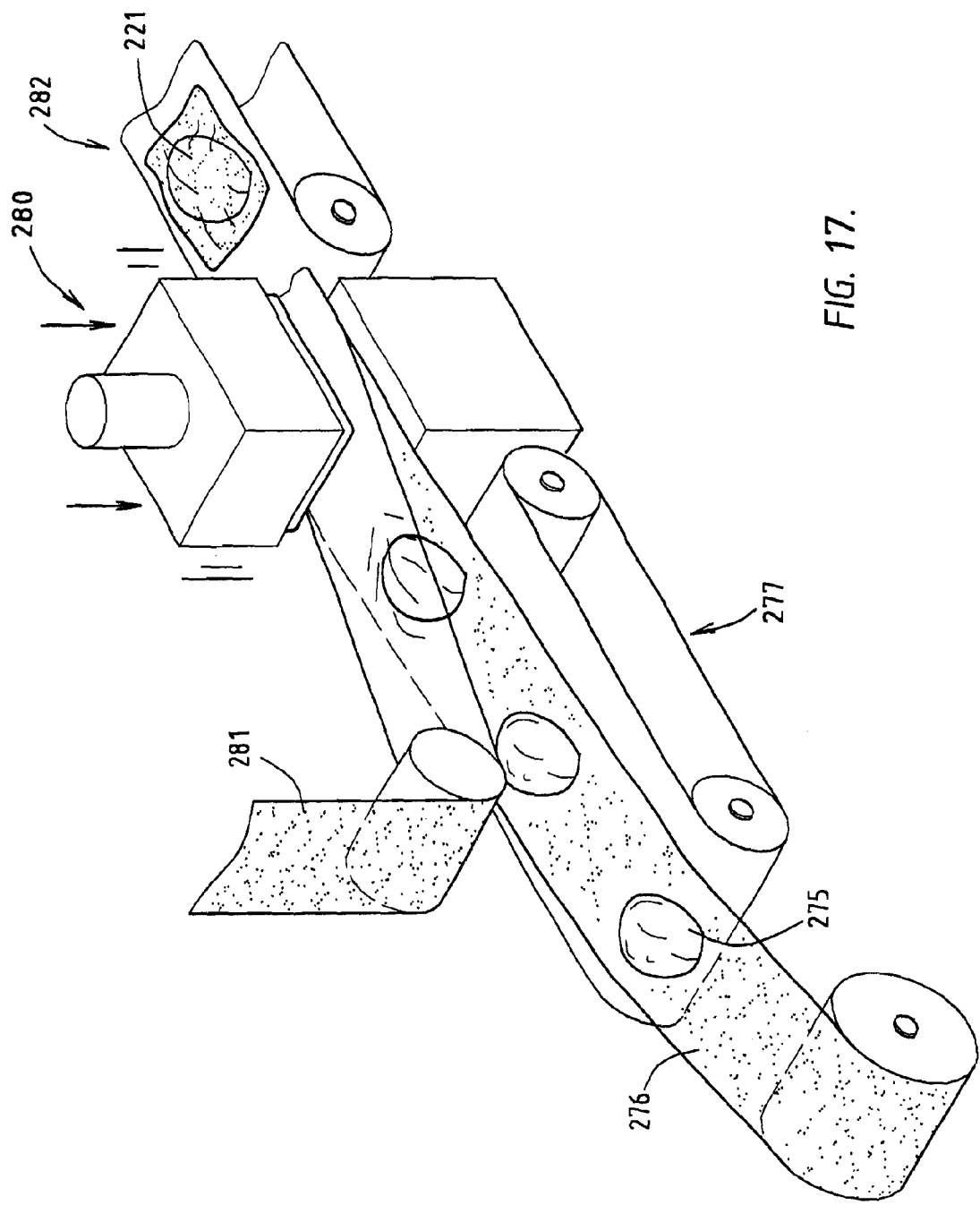
FIG. 17 shows a sixteenth exemplary embodiment of the invention.

FIG. 17 shows a variant embodiment of the inventive idea which has already been described with reference to FIG. 16. In FIG. 17, the meat products 275 which are to be treated and packaged are placed on a bottom film web 276, which is provided with additive and rests on feed means 277 for supplying the products to a parting-welding device 280. A top film web 281, which is also provided with additive, rests over the meat products 275 at the parting-welding device 280, in such a manner that the said device 280 is able to form a join between the two film webs 276 and 281 around each meat product 275. Preferably, a vacuum is applied to the packaging, so that that side of each film web which has been provided with additive bears taut against the meat product 275. The packaged meat products are removed by a removal means 282.

Figure 18A:
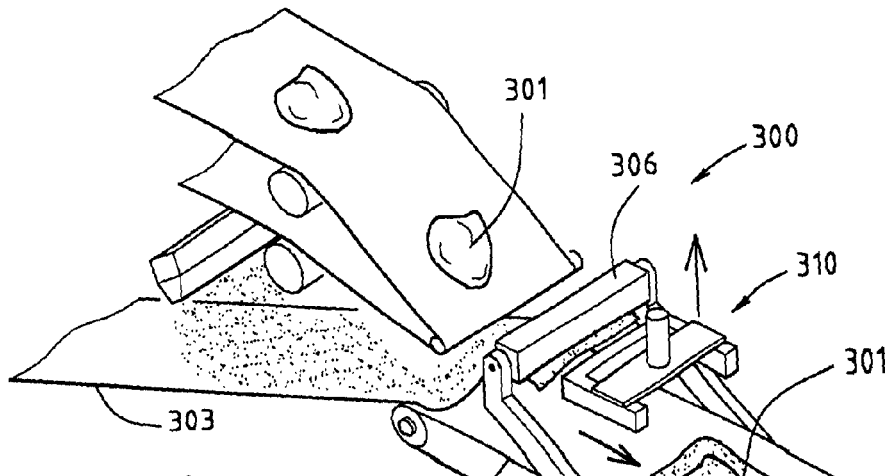
FIGS. 18a-c show a seventeenth exemplary embodiment of the invention.
Figure 18B:
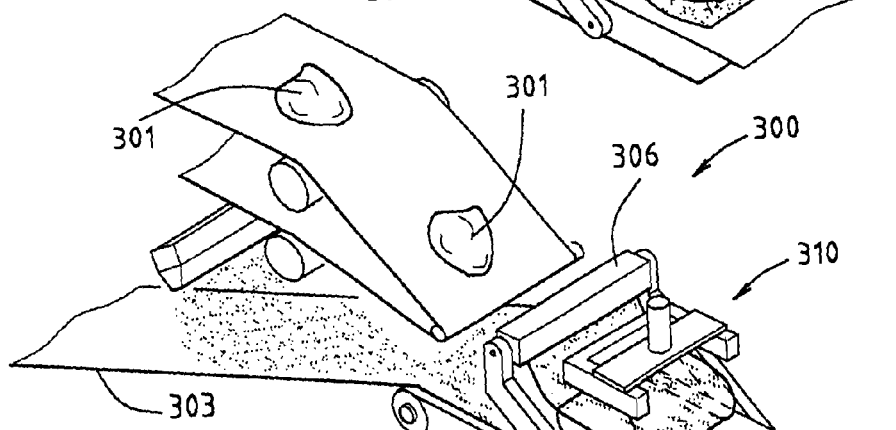
Figure 18C:
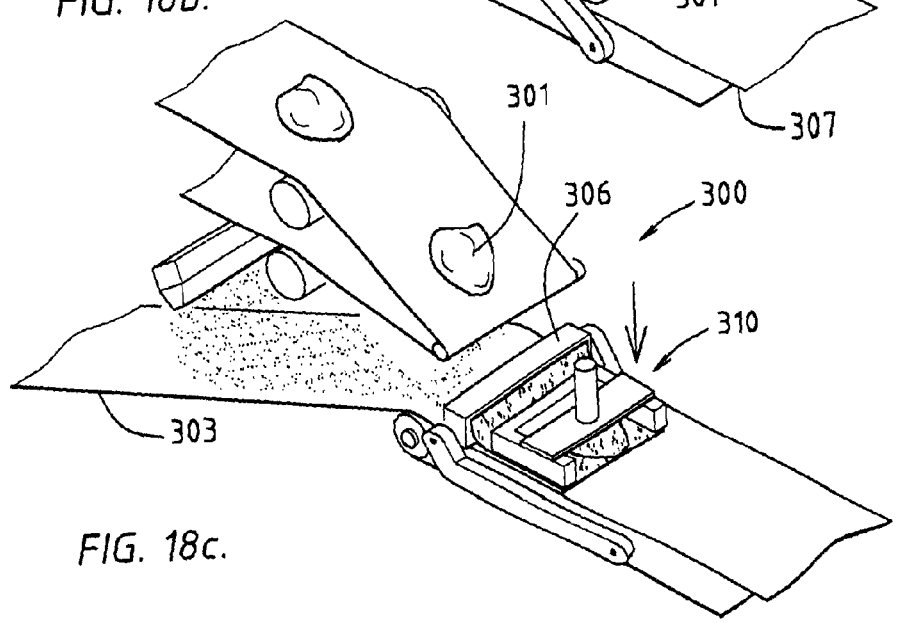

FIGS. 18a, 18b and 18c show the way in which an additive-adding device 300 operates, meat products 301, in this example breast portions of chicken, being packaged in a film 303 which is provided with additive. The film 303 is supplied in the additive-free state, for example from a stock reel, and is provided with an additive on one side, in this case the upwardly facing side, at application station 304. The film may be a single-layer plastic film, but could also be composed, for example, of a plurality of layers, for example with a sealing layer and a layer which holds and slowly releases additive. The latter layer could, for example, be porous, for example in the form of a nonwoven or woven fabric, if appropriate made from plastics material.

The application station 304 may be designed to completely cover the film 303 with additive on one side, but could also be designed to provide only selected areas with additive. The end of the film 303 is gripped securely by a gripper bar 306, for example using a vacuum, and can thus be moved up and down with respect to a conveyor belt 307. A feed means 308 for the meat products 301 is provided, in order to deposit the said meat products 301 one by one or, if appropriate, in groups on the film 303, which has been provided with additive, in the vicinity of the gripper bar 306, specifically on a part of this film which is resting on the conveyor belt 307, the ends of the film 303 being held at a distance above the belt 307 by the bar 306 (cf. FIG. 18a). Due to the movement of the belt 307, the meat product 301 which is resting on the film 303 is moved through beneath the gripper bar 306, so that a fold is formed in the film 303 and the film 303 covers the meat product 301 in question (cf. FIG. 18b). The bar 306 then moves towards the belt 306 and a suitably designed film-welding device 310 welds the pieces of film together around the meat product and also separates the meat product 301 which has been packaged in film in this way from the film web 303 (cf. FIG. 18c).

The additive may also, for example, be a gelatinous substance which is applied to the film 303 in a layer.

The appended claims describe a large number of methods and devices according to the invention. It will be clear that the methods described in claims 28-30 can also be used independently of the method described in claim 1. Many of the devices and components thereof which are described in the claims and description may also be used independently of the method described in claim 1.

What is claimed is:

1. A method for treating a meat product comprising meat, the method comprising:
    (a) positioning a meat product on a meat product holder of a conveyor device comprising a plurality of meat product holders movable along a conveyor track;
    (b) thereafter conveying the meat product holder along the conveyor track and to an additive-adding device positioned alongside the conveyor track, wherein the additive-adding device comprises at least one jet nozzle;
    (c) impinging an additive onto the meat product with the at least one jet nozzle so that the additive penetrates into the meat of the meat product while the meat product is held by the meat product holder;
    (d) thereafter further conveying the meat product holder along the conveyor track and to a massaging device positioned alongside the conveyor track; and
    (e) mechanically massaging the meat product with the massaging device while the meat product is held by the meat product holder, wherein mechanically massaging the meat product promotes distribution of the additive within the meat product.

2. The method of claim 1, wherein the massaging device comprises projections provided on a rotatable shaft and wherein mechanically massaging the meat product comprises rotating the shaft so that the projections contact the meat product.

3. The method of claim 1 wherein mechanically massaging the meat product comprises blasting particles onto the meat product.

4. The method of claim 1, wherein mechanically massaging the meat product comprises directing air jets onto the meat product.

5. The method of claim 1 wherein the meat product comprises poultry meat and wherein the additive comprises fat.

6. The method of claim 1, wherein the method further comprises using a detector positioned along the conveyor track upstream of the additive-adding device to detect at least one parameter of the meat product prior to treating the meat product with an additive and controlling the additive-adding device based on the at least one detected parameter.

7. The method of claim 6, wherein the at least one parameter comprises a weight, a shape, or a dimension of the meat product.

8. The method of claim 1, wherein at least a portion of the meat product is not penetrated during treatment of the meat product with an additive.

9. The method of claim 1, further comprising positioning the meat product in different orientations relative to the additive-adding device while treating the meat product with the additive.

10. The method of claim 1, wherein the meat product holder comprises a rotatable holding head, and wherein the method further comprises rotating the meat product in different orientations while treating the meat product with the additive.

11. The method of claim 1 wherein the meat product comprises a poultry leg and wherein positioning a meat product on a meat product holder comprises encircling the poultry leg with the meat product holder so that the poultry leg is hanging downwardly from the meat product holder.

12. A method for treating a meat product, the method comprising:
   (a) positioning a meat product on a meat product holder of a conveyor device comprising a plurality of meat product holders movable along a conveyor track;
   (b) thereafter conveying the meat product holder along the conveyor track and to an additive-adding device positioned alongside the conveyor track, wherein the additive-adding device comprises at least one injection needle movable relative to the meat product holder;
   (c) injecting an amount of an additive into the meat product with the at least one injection needle while the meat product is held by the meat product holder;
   (d) thereafter further conveying the meat product holder along the conveyor track and to a massaging device positioned alongside the conveyor track; and
   (e) mechanically massaging the meat product with the massaging device while the meat product is held by the meat product holder, wherein mechanically massaging the meat product promotes distribution of the additive within the meat product.

13. The method of claim 12 wherein injecting an amount of an additive into the meat product with the at least one injection needle comprises injecting the amount of the additive into the meat product with the at least one injection needle to a penetration depth, wherein the method further comprises controlling at least one of the penetration depth and the amount of the additive injected into the meat product.

14. The method of claim 12, wherein the massaging device comprises projections provided on a rotatable shaft and wherein mechanically massaging the meat product comprises rotating the shaft so that the projections contact the meat product.

15. The method of claim 12, wherein mechanically massaging the meat product comprises blasting particles onto the meat product.

16. The method of claim 12, wherein mechanically massaging the meat product comprises directing air jets onto the meat product.

17. The method of claim 12, wherein the meat product comprises poultry meat and wherein the additive comprises fat.

18. The method of claim 12, wherein the method further comprises using a detector positioned along the conveyor track upstream of the additive-adding device to detect at least one parameter of the meat product prior to injecting the meat product with the additive and controlling the additive-adding device based on the at least one detected parameter.

19. The method of claim 18, wherein the at least one parameter comprises a weight, a shape, or a dimension of the meat product.

20. The method of claim 12, wherein at least a portion of the meat product is not injected during injection of the meat product with an additive.

21. The method of claim 12, further comprising positioning the meat product in different orientations relative to the additive-adding device while injecting the meat product with the additive.

22. The method of claim 12, wherein the meat product holder comprises a rotatable holding head, and wherein the method further comprises rotating the meat product in different orientations while injecting the meat product with the additive.

23. The method of claim 12, wherein the meat product comprises a poultry leg and wherein positioning a meat product on a meat product holder comprises encircling the poultry leg with the meat product holder so that the poultry leg is hanging downwardly from the meat product holder.

* * * * *